US010833977B2

(12) United States Patent
Abdallah et al.

(10) Patent No.: US 10,833,977 B2
(45) Date of Patent: *Nov. 10, 2020

(54) ROBUST DATA ROUTING IN WIRELESS NETWORKS WITH DIRECTIONAL TRANSMISSIONS

(71) Applicant: SONY CORPORATION, Tokyo (JP)

(72) Inventors: Ramy Abdallah, San Jose, CA (US); Kazuyuki Sakoda, Campbell, CA (US)

(73) Assignee: SONY CORPORATION, Tokyo (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,682

(22) Filed: Dec. 17, 2018

(65) Prior Publication Data

US 2019/0199618 A1 Jun. 27, 2019

Related U.S. Application Data

(63) Continuation of application No. 15/387,457, filed on Dec. 21, 2016, now Pat. No. 10,193,795.

(51) Int. Cl.
*H04L 12/707* (2013.01)
*H04W 40/24* (2009.01)
(Continued)

(52) U.S. Cl.
CPC .......... *H04L 45/22* (2013.01); *H04B 7/0413* (2013.01); *H04B 7/0695* (2013.01); *H04B 7/0697* (2013.01); *H04L 45/12* (2013.01); *H04L 45/128* (2013.01); *H04L 45/24* (2013.01); *H04L 45/28* (2013.01); *H04W 40/06* (2013.01);
(Continued)

(58) Field of Classification Search
CPC ........ H04L 45/22; H04L 45/28; H04B 7/0413
See application file for complete search history.

(56) References Cited

U.S. PATENT DOCUMENTS 6,721,269 B2   4/2004  Cao et al.
7,590,756 B2   9/2009  Chan
(Continued)

FOREIGN PATENT DOCUMENTS

JP   2004282244 A   10/2004
JP   2005167304      6/2005
(Continued)

OTHER PUBLICATIONS

Singla, Er. Rubia et al., Node-Disjoint Multipath Routing Based on AOMDV Protocol for MANETS, International Journal of Computer Science and Information Technologies, vol. 5 (4), 2014, 5491-5496.
(Continued)

*Primary Examiner* — Melanie Jagannathan
(74) *Attorney, Agent, or Firm* — O'Banion & Ritchey LLP; John P. O'Banion

(57) ABSTRACT

A method and apparatus for routing the same data through independent routes between stations in a mesh network to increase the robustness of communications. The disclosed feature allows transmission of the same data stream via multiple routes from a source station (STA) to a destination station (STA). An extended routing request (RREQ) and routing reply (RREP) are utilized which provide a primary and secondary flag indication, which is utilized in combination with advanced programming for setting path cost metrics to assure independence of primary and secondary routes.

19 Claims, 24 Drawing Sheets

(51) Int. Cl.

| | |
|---|---|
| *H04L 12/703* | (2013.01) |
| *H04W 74/08* | (2009.01) |
| *H04W 74/00* | (2009.01) |
| *H04L 12/721* | (2013.01) |
| *H04W 40/06* | (2009.01) |
| *H04L 12/735* | (2013.01) |
| *H04B 7/06* | (2006.01) |
| *H04B 7/0413* | (2017.01) |
| *H04W 84/18* | (2009.01) |
| *H04W 88/04* | (2009.01) |

(52) U.S. Cl.
CPC ....... *H04W 40/246* (2013.01); *H04W 74/002* (2013.01); *H04W 74/0816* (2013.01); *H04W 84/18* (2013.01); *H04W 88/04* (2013.01); *Y02D 70/10* (2018.01); *Y02D 70/14* (2018.01); *Y02D 70/142* (2018.01); *Y02D 70/144* (2018.01); *Y02D 70/162* (2018.01); *Y02D 70/20* (2018.01); *Y02D 70/21* (2018.01); *Y02D 70/22* (2018.01); *Y02D 70/322* (2018.01)

(56) References Cited

U.S. PATENT DOCUMENTS

| | | |
|---|---|---|
| 8,406,127 B2 | 3/2013 | Fall et al. |
| 8,509,109 B2 | 8/2013 | Guo et al. |
| 2008/0051036 A1 | 2/2008 | Vaswani et al. |
| 2008/0170857 A1 | 7/2008 | Bardalai |
| 2010/0027517 A1 | 2/2010 | Bonta et al. |
| 2012/0327792 A1 | 12/2012 | Guo et al. |
| 2016/0021664 A1 | 1/2016 | Chou |
| 2016/0043843 A1 | 2/2016 | Liu et al. |
| 2016/0381596 A1 | 12/2016 | Hu et al. |
| 2017/0195035 A1 | 7/2017 | Calcev et al. |

FOREIGN PATENT DOCUMENTS

| | | |
|---|---|---|
| JP | 2016504804 | 2/2006 |
| KR | 1020120055530 | 5/2012 |
| WO | 2008/064186 A2 | 5/2008 |
| WO | 2010141727 | 12/2010 |
| WO | 2014/074894 A1 | 5/2014 |
| WO | 2015/109153 A1 | 7/2015 |
| WO | 2016/086144 A1 | 6/2016 |

OTHER PUBLICATIONS

Deulkar, Snehal P. et al., "Discovery of Path Using Node-Disjoint Multipath Routing Method Based on AODV Protocol", International Journal of Advanced Research in Computer Science and Software Engineering, vol. 4, Issue 2, Feb. 2014, pp. 730-736.

Abd El-Haleem, Ahmed M. et al., "Tridnt: The Trust-Based Routing Protocol With Controlled Degree of Selfishness for Manet", International Journal of Network Security & Its Applications (IJNSA), vol. 3, No. 3, May 2011, pp. 189-204.

European Patent Office (EPO), International Search Report and Written Opinion dated Dec. 18, 2017, related PCT international application No. PCT/US2017/048678, pp. 1-13, with claims searched, pp. 14-19.

Saha, Dola et al., "An Adaptive Framework for Multipath Routing via Maximally Zone-Disjoint Shortest Paths in Ad ho Wireless Networks with Directional Antenna", Globecom 2003, Proceedings of IEEE Global Telecommunications Conference, San Francisco, CA, Dec. 1-5, 2003, pp. 226-230.

Korean Intellectual Property Office (KIPO), Notice of Preliminary Rejection dated Apr. 29, 2020, related Korean patent application No. 10-2019-7016556, pp. 1-2, English-language translation, pp. 3-4.

Japan Patent Office (JPO), official action dated Jun. 23, 2020, related Japanese patent application No. 2019-554471, pp. 1-3, English-language translation, pp. 4-6, claims examined, pp. 7-12.

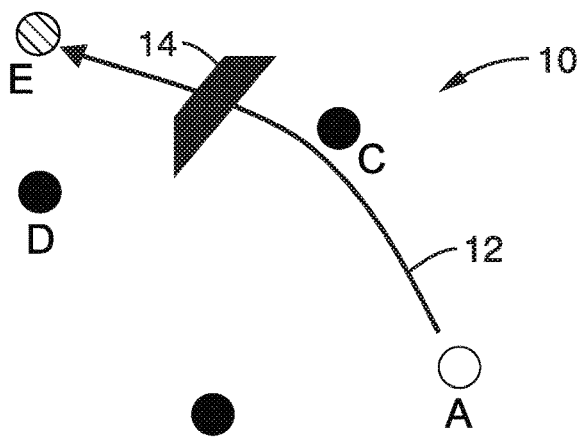
FIG. 1
(Prior Art)
FIG. 2
(Prior Art)
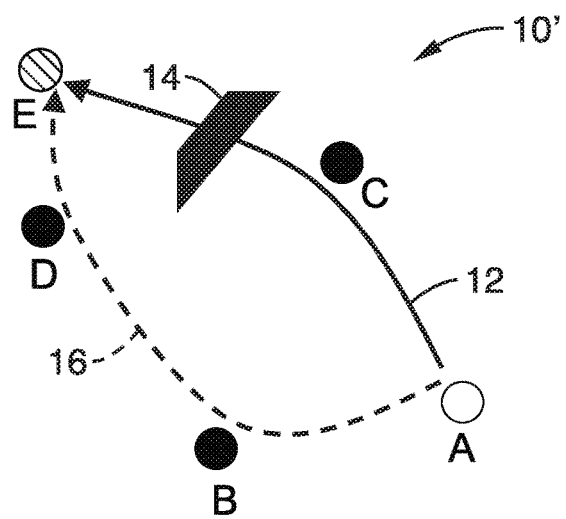
FIG. 3
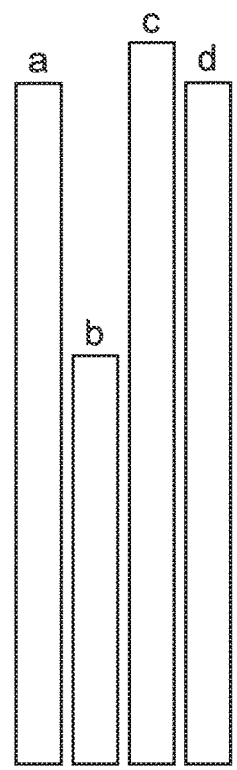
FIG. 4

| 1 | 2 | 3 | 4 | 5 | 6 | 7 | 8 | 9 |
|---|---|---|---|---|---|---|---|---|
| IE ID | length | SA | SSEQ | Broadcast ID | DA | DSEQ | route flag | Metric |

Extended RREQ IE

| 1 | 2 | 3 | 4 | 5 | 6 | 7 | 8 |
|---|---|---|---|---|---|---|---|
| IE ID | length | SA | DA | DSEQ | route flag | Lifetime | Metric |

Extended RREP IE

| 1 | 2 | 3 | 4 | 5 | 6 | 7 | 8 | 9 |
|---|---|---|---|---|---|---|---|---|
| Frame control | Duration | RA | TA | SA | DA | Lifetime | Time offset | FCS |

Routing CTS frame format

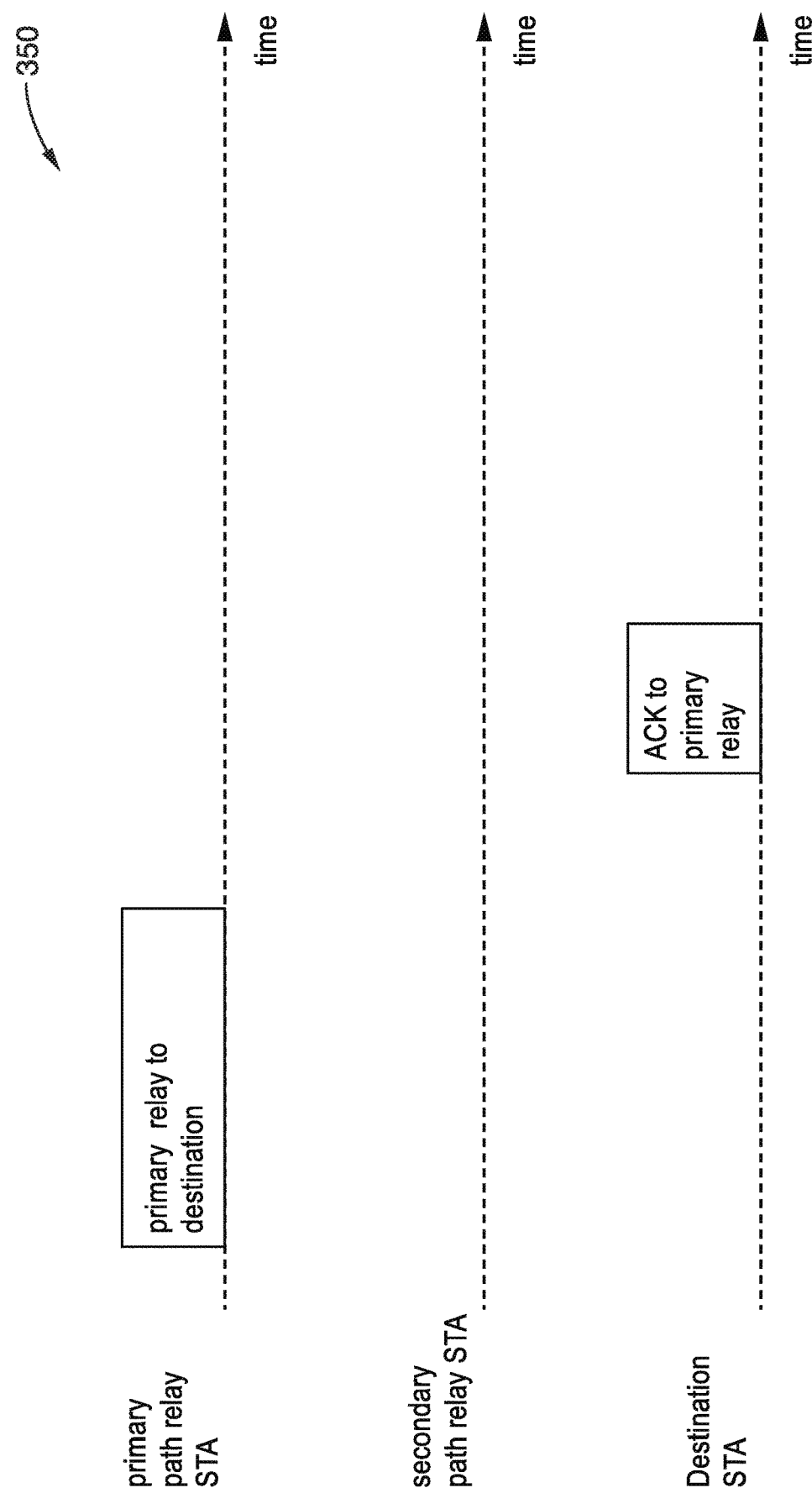

ROBUST DATA ROUTING IN WIRELESS NETWORKS WITH DIRECTIONAL TRANSMISSIONS

CROSS-REFERENCE TO RELATED APPLICATIONS

This application claims priority to, and is a continuation of, U.S. patent application Ser. No. 15/387,457 filed on Dec. 21, 2016, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to data routing in directional wireless networks, and more particularly to recovering from link blockages in a directional wireless network.

2. Background Discussion

Link dynamics in millimeter-wave (mmWave) networks have characteristics which can be compared in some respects to transmission time. That is to say, that blockage can arise frequently, in particular with indoor setups or outdoor environments in response to object and/or station mobility. In mmWave frequencies blockage can cause the received signal power of a link to drop significantly, which renders the communication link inoperative. The cost of recovering from a blocked link in multi-hop networks is significant in terms of both the time and data communications required to reestablish a connection.

Accordingly, methods are needed for recovering from blockages, or other link outages in a mesh network. The technology of this disclosure provides this functionality while overcoming the shortcomings of previous routing protocols.

BRIEF SUMMARY

Path diversity may be needed to overcome blockage for delay sensitive data content in mmWave mesh networks. However, typical wireless routing protocols discover one best route from the source station (STA) and the destination STA. These protocols are not configured to create a secondary path to cope with blockage. Hence, STAs do not transmit multiple streams to make the end-to-end transmission robust.

Routing protocols specify how different network STAs communicate with each other, disseminating information that enables them to select routes between any two STAs on a network. A method and apparatus are disclosed for creating a secondary path in addition to the primary path in order to route the same data contents through both paths to overcome link failure problems in wireless communication networks.

Generally speaking, the disclosure teaches a new routing protocol in wireless networks in which primary and secondary path discovery is performed. The protocol utilizes antenna patterns and the beamforming (BF) training information to select the next-hop of the secondary path that is spatially uncorrelated with the primary path next-hop. A new handshaking mechanism is performed to coordinate the reception of data from the two routes at the destination station to minimize errors and delays in reception.

The specification describes the target as being mesh networking applications which can be applied to wireless LAN (WLAN), wireless personal area networks (WPAN), and outdoor wireless communications. Thus, the target applications can range from Wi-Fi like networks, internet of things (IoT) applications, backhauling of data by mesh networking, next generation cellular networks with D2D communications, IEEE802.11s, IEEE802.11ad, and IEEE 802.15.4 (ZigBee), Device-to-device (D2D) communications, Peer-to-peer (P2P) communications, and the like.

A number of terms are found in the disclosure whose meanings are generally utilized as described below.

AODV: Ad-hoc On-Demand Distance Vector, a routing protocol for data packets in ad-hoc wireless networks.

D2D: Device-to-Device communications.

DMG: Directional Multi-gigabit.

Mesh networks: In a mesh network topology each node relays data for the network, and all mesh nodes cooperate in the distribution of data in the network. Mesh networks are a type of ad-hoc (spontaneous, impromptu, or on-the-fly construction) network.

MIMO: Multiple Input Multiple Output; communications between two devices with multiple streams of data.

MU-MIMO: Multi-User Multiple Input Multiple Output; communications between a device and two or more nodes with single or multiple streams of data per node.

Multicast: In networking, multicasting is a one-to-many form of group communication implemented at layers above the physical layer where information is addressed to a group of destination STAs simultaneously.

P2P: Peer-to-peer (P2P) communications arise when two or more stations are connected and share resources without going through a separate controller/server. A P2P network can be an ad hoc connection.

RREQ: Routing Request, a packet used in data routing protocols to discover the path between the source STA and the destination STA.

RREP: Routing Reply, a packet transmitted in response to RREQ in routing protocols. Upon reception of RREP by a source STA it can start transmitting the data packets.

RSS: Received Signal Strength (RSS) is a measurement of the power present in a received radio signal.

SISO: Single Input Single Output; communications between two devices with a single stream of data.

STA: Station; a logical entity that is a singly addressable instance of a medium access control (MAC) and physical layer (PHY) interface to the wireless medium (WM).

Unicast: In networking, unicast is a one-to-one connection between two STAs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of a conventional clear to send (CTS) frame.

FIG. 2 is a topology diagram of a conventional wireless network having multiple peer nodes, shown subject to data loss in response to a blockage.

FIG. 3 is a topology diagram of an example wireless network having multiple peer nodes through which primary and secondary routing paths are determined according to an embodiment of the technology of this disclosure, to overcome the effects of a blockage on either of the routes.

FIG. 4 is a bar chart comparing received signal strength in response to blockage, and the use of two paths for sending the same data according to an embodiment of the technology of this disclosure.

FIG. 22A and FIG. 22B are data transmission diagrams of transmissions by the primary relay, destination STA, and secondary path relays according to an embodiment of the technology of this disclosure.

DETAILED DESCRIPTION

Figure 5A:
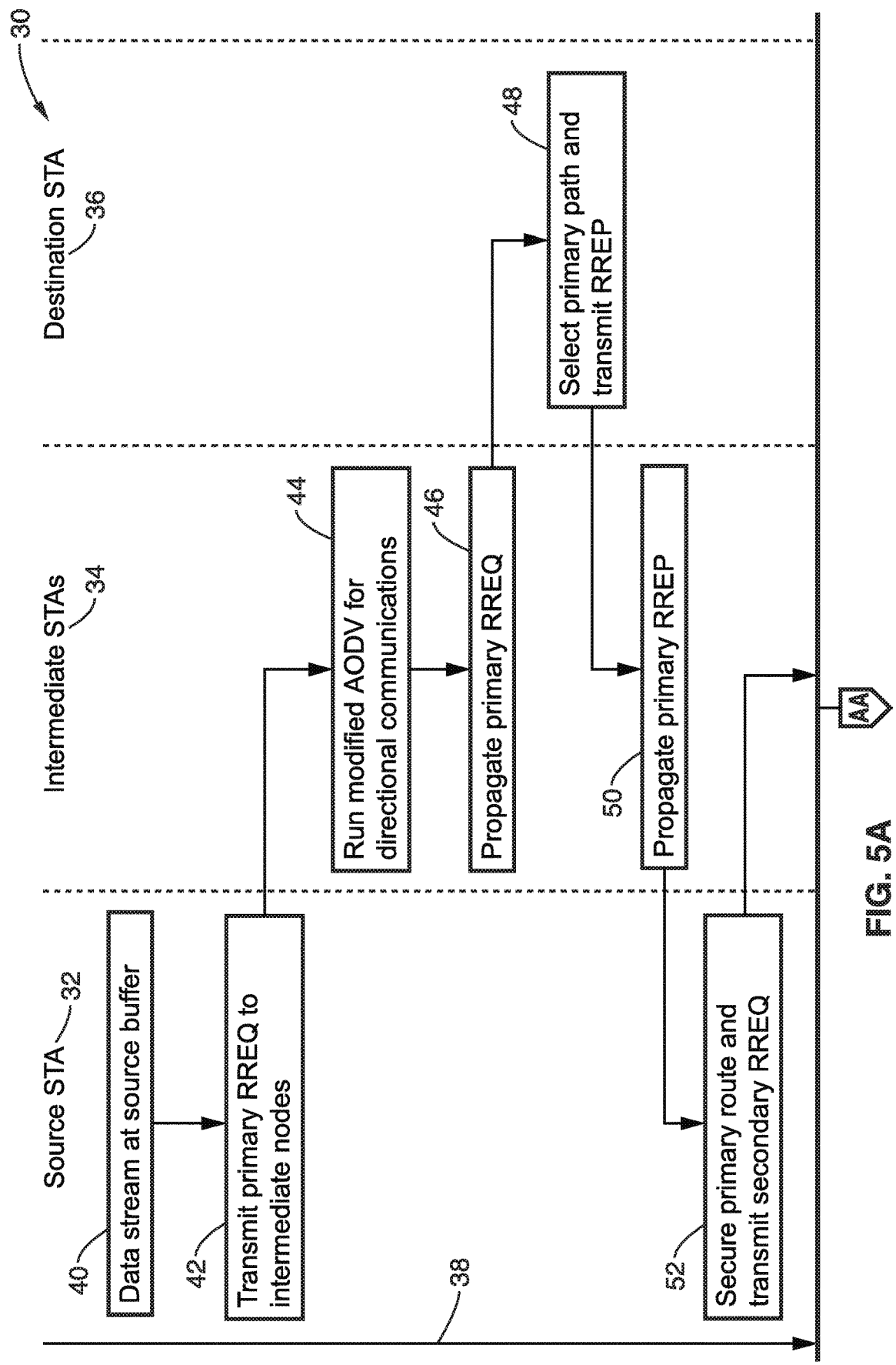
FIG. 5A and FIG. 5B are a flow diagram-timeline of wireless data routing of the same data through a primary and secondary route according to an embodiment of the technology of this disclosure.

1. Introduction.

An apparatus and method for robust data routing to overcome the effects of blockage, by utilizing a secondary path transmission to improve robustness and reception quality. Elements of the routing protocol include selection of spatially uncorrelated primary and secondary path links. Protocol operation comprises selection of links for neighbor STAs uncorrelated with the primary path. For example applying the routing protocol on a mmWave mesh network, and having data reception from two routes at the destination STA as any of the following situations: (1) uncoordinated reception; (2) coordinated reception: combining received signal powers; or (3) coordinated reception: conditional reception from secondary route.

1.1. Benefits Provided.

Robust data routing in mmWave mesh networks are described which are configured to utilize a secondary path to allow the same data packets to be transmitted through both the primary and secondary paths. The disclosure describes a set of routing protocol rules to discover the primary and secondary paths.

The disclosure also teaches a method to discover a secondary path that is not spatially correlated with the primary path so that diversity is achieved against blockage effects. The protocol takes advantage of the characteristics of communications at the mmWave networks enabling spatial re-use between primary path and secondary path communications. The disclosure additionally proposes a coordination method for data reception at the destination station from the two routes.

2. AODV Routing Summary.

Ad-hoc on-demand distance vector (AODV) is a routing protocol to establish an end-to-end communication route through multiple hop relaying. With AODV, the route from source STA to destination STA will be determined by the following procedure: (1) Source STA transmits RREQ frames in multicast fashion; (2) Intermediate STAs propagate the RREQ frames in multicast fashion; (3) Destination STA replies back with RREP frame toward the source STA in unicast fashion (remembering the chain of next-hop STAs); (4) Intermediate STAs propagate the RREP toward the source STA in unicast fashion (remembering the chain of next-hop STAs); (5) Upon reception of the RREP frame, the source STA remembers the next-hop STA, and starts data communication using the route procedure by RREQ/RREP handshaking.

AODV and typical routing protocols discover one best route from the source STA to the destination STA. They do not create a secondary path to cope with blockage. Hence, STAs do not transmit multiple streams to make the end-to-end transmission robust.

3. Existing RTS/CTS Procedures.

FIG. 1 shows an example of a state-of-the-art CTS frame as described in 802.11ad specifications, showing the fields, with a field number above the figure and the number of octets per field shown below the frame diagram. It will be appreciated that ready-to-send (RTS), clear-to-send (CTS) are data communication procedures. The CTS frame is shown with these fields: (1) frame control, (2) duration, (3) receiver address (RA), (4) transmitter address (TA), (5) frame check sequence (FCS). In 802.11 WLAN systems, the RTS/CTS procedure is used to protect data transmission on a particular link.

For all directional Multi-gigabit (DMG) CTS frames sent in response to RTS frames, the duration value is the value obtained from the duration field of the immediately previous RTS frame, minus the time (in microseconds) required to transmit the DMG CTS frame and its short-interframe-space (SIFS) interval. Otherwise, the duration field is set to the remaining duration of the transmission slot time.

The RA field of the frame is copied from the TA field of the immediately previous RTS frame to which the DMG CTS is a response. The TA field is the MAC address of the STA transmitting the DMG CTS frame.

4. Robust Routing Embodiments.

A mmWave mesh network is described by way of example and not limitation, as it will be appreciated that the described protocol is applicable to a number of node-to-node wireless communications situations which might not be considered a mmWave mesh network.

FIG. 2 is a topology diagram showing an example routing path 10 from source STA to destination STA, illustrating a case in which the selected path has been blocked during data transmission resulting in link failure. In the figure, STAs A, B, C, D, and E are shown by way of example in a local wireless mesh. A routing path 12 from source STA A through intermediate STA C to destination STA E is shown being blocked 14.

Due to movement of the STAs or the surroundings, link blockage can arise. In the figure a source STA, "A" has packets intended to destination STA "E". Using an on-demand routing protocol, the path selected from source STA to destination STA is shown 12. After data transmission commenced this path became blocked 14. If the blockage persists for a sufficient period of time, retransmissions and feedback messaging would both fail. Detecting this blockage and employing techniques to recover from it in mmWave networks, such as performing a self-healing routing procedure, involve the consumption of significant messaging overhead and time.

4.1. Overview of Robust Routing.

FIG. 3 illustrates an example routing topology 10', depicting the same situation as in FIG. 2, but in this case the disclosed protocol is configured to route the same data through both a primary path (solid line) 12 and secondary path (dashed) 16, from a source STA (STA A in this example) to a destination STA (STA E in this example) that processes the signals from the two paths. Despite a blocking object 14 arising on the primary path, a communication outage does not occur because of the transmission of the secondary path.

It should be appreciated that routing the primary and secondary data along the same path from STA A through STA C to STA E, would not overcome the blockage situation. However, with the introductions of a form of path diversity 16, as seen in the figure, robustness of data routing in mmWave can be achieved. As depicted in the figure, the secondary path 16 allows communications to be achieved without disruption from the source STA to the destination STA. The source STA can utilize both paths to transmit the same data to the destination simultaneously.

4.2. Effect of Blockage and Secondary Path on Reception Quality.

In mmWave communications, link blockage can cause significant signal losses (e.g., most often in the range of approximately 18-30 dB loss) of the received signal power at the receiving STA. In view of the already tight link budget that exists in mmWave frequencies due high free space path loss (FSPL) and large $O_2/H_2O$ absorption, this blockage loss could render a link inoperative.

FIG. 4 shows some representative comparison between the received signal strength (RSS) (assuming dBm scale) for a few cases: (a) from the primary path if unblocked, (b) from the primary path if it is blocked, (c) from both paths if unblocked, (d) from both paths with one of them blocked. In this example the primary unobstructed path, for example is a −60 dBm primary path with obstruction (blockage), comprising a loss of 20 dB, which results in a −80 dBm RSS.

RSS at the destination STA, if both primary and secondary paths are unobstructed, is −57 dBm in this example for bar (c) in the figure. On a dB scale, 3 dB increase in signal is achieved when combining the power from both paths at the receiver, assuming equal RSS from each path.

Bar (d) in the figure shows RSS at the destination STA if only one path is obstructed. The obstructed path contributes a minor addition to the RSS on a dB scale, such that if the unobstructed path RSS is −60 dBm and the obstructed path is −80 dBm, the resultant RSS is −59.96. Comparing cases (b) and (d) from the figure shows the immense importance of having path diversity against blockage.

4.3. Elements of the Routing Protocol.

Figure 5B:
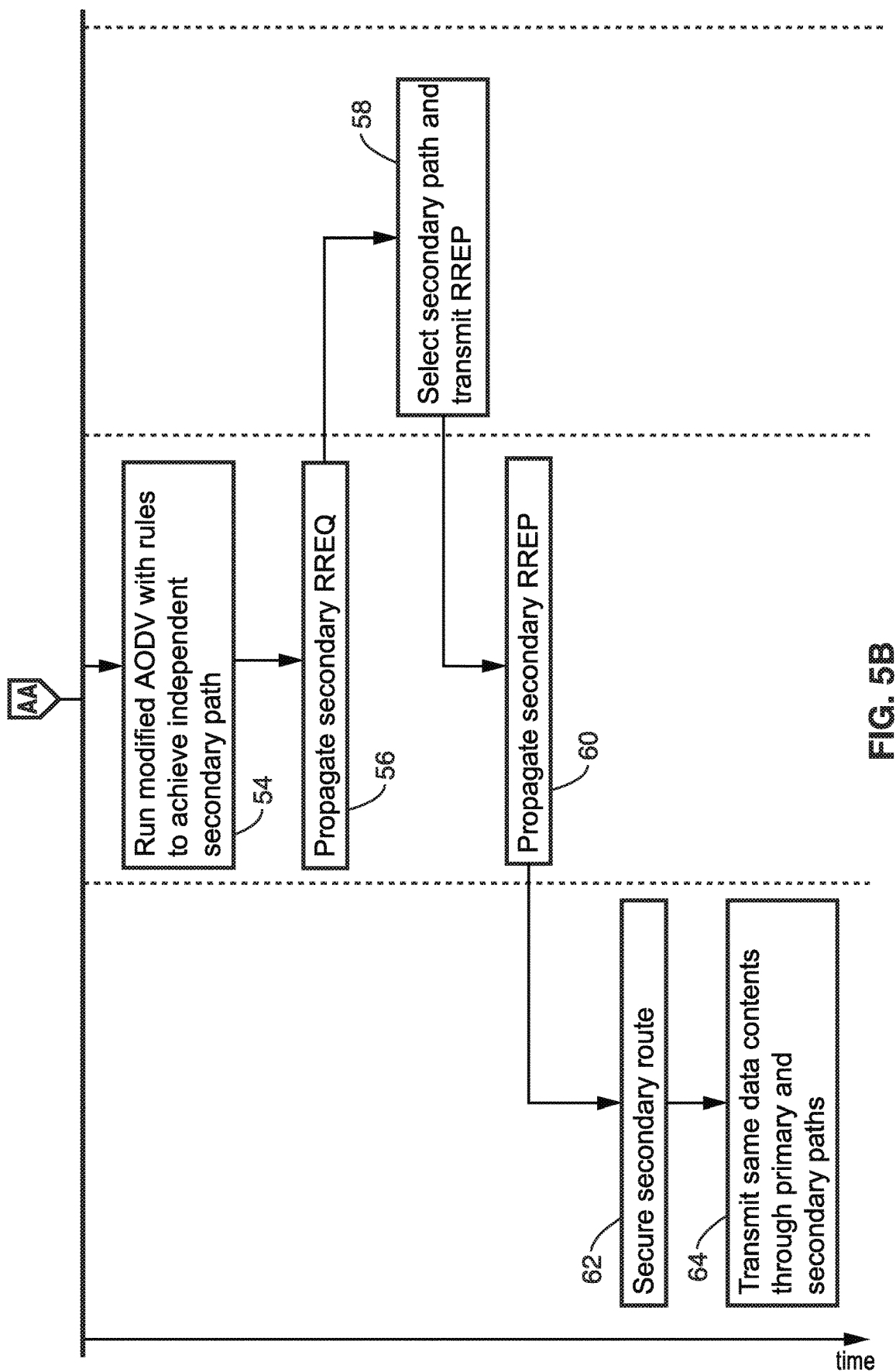

FIG. 5A through FIG. 5B illustrates an example embodiment 30 of a messaging flow-timeline of securing a primary and secondary path from source 32, through intermediate STAs 34, to a destination 36, with respect to a timeline 38. The disclosed protocol sets the primary path and secondary path from a source STA to a destination STA, in response to using modified RREQ and RREP information elements that are termed extended RREQ and extended RREP, respectively.

Following the flow of FIG. 5A, the protocol is triggered by source STA 32, which is seeking to send a spatial stream 40 in a robust transmission through intermediate STAs to a destination STA. The routing protocol starts by broadcasting an extended RREQ 42 to intermediate nodes (STAs) with its route flag set to primary. The rules for the primary route at the source STA, destination STA and the intermediate STAs (possible relays) follow those of the baseline routing protocol, which by way of example and not limitation is AODV, except for path metric cost adjustment due to MIMO capability.

At block 44 an intermediate node, which is MIMO capable, weighs its path cost favorably, and propagates in a unicast manner the primary RREQ 46, to another intermediate STA or to destination STA 36. The destination station selects a primary path 48 and transmits an RREP back toward the source, which is picked up by intermediate STA 34 which propagates 50 the RREP to source STA 32, which secures 52 the primary route.

When the primary route is secured source STA triggers 52 path discovery of a secondary route by transmitting 52 an extended RREQ with its route flag set to secondary. Then as seen in FIG. 5B, the intermediate STA runs a modified AODV 54 and performs cost adjustments for MIMO capability and for secondary independence, then propagates 56 using a unicast technique this secondary RREQ to another intermediate STA or to destination STA 36 which evaluates 58 the secondary route path cost, selects a secondary path and transmits RREP to the intermediate 34. Intermediate 34 then propagates 60 this secondary RREP to source STA 32, which secures 62 the secondary route, and transmits 64 the same content through both the primary and secondary routes.

According to the disclosed protocol, the intermediate STAs and the destination STA deal differently with the secondary RREQ. They employ certain rules in the disclosed protocol which encourage the following. (a) The inclusion of MIMO STAs on the primary and secondary route to be able to use advanced physical layer MIMO communications schemes, such as spatial multiplexing and MU-MIMO. (b) Discovering of an end-to-end route that is not overlapped with the primary route.

Figures 6, 7, 8, 9:
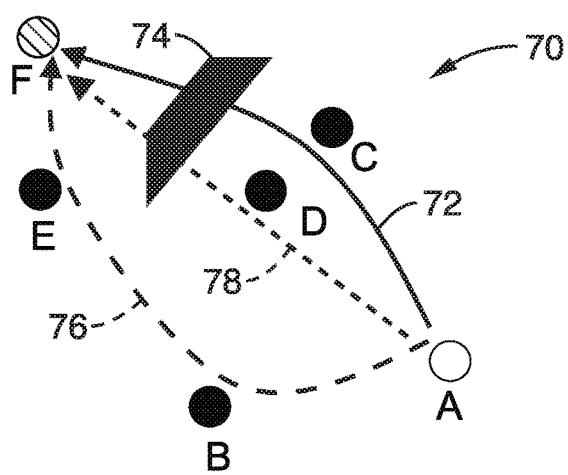
FIG. 6 is a data field diagram of an extended routing request (RREQ) utilized according to an embodiment of the technology of this disclosure.
FIG. 7 is a data field diagram of an extended routing reply (RREP) utilized according to an embodiment of the technology of this disclosure.
FIG. 8 is a data field diagram of an extended routing clear-to-send (CTS) frame utilized according to an embodiment of the technology of this disclosure.
FIG. 9 is a topology diagram of an example wireless network, showing spatial correlation impacts of routing which are overcome according to an embodiment of the technology of this disclosure.

FIG. 6 and FIG. 7 illustrate example embodiments of an extended routing request (RREQ) information entity (IE) and an extended routing response (RREP) IE, respectively.

In FIG. 6 the RREQ fields are depicted as follows.
1: IE ID—a sequence identifier of RREQ for this source;
2: length—length of the RREQ IE;
3: SA—source address;
4: SSEQ—source sequence number associated to the route;
5: Broadcast ID—incremented for each RREQ by source;
6: DA—destination address;
7: DSEQ—destination sequence number associated to route;
8: Route Flag—flag indicating primary or secondary route; and
9: Metric—path cost metrics.

In FIG. 7, fields of the routing reply (RREP) IE are as follows.

1: IE ID—a sequence identifier of RREP for this destination;
2: length—length of the RREQ IE;
3: SA—source address;
4: DA—destination address;
5: DSEQ—destination sequence number associated to route;
6: Route Flag—flag indicating primary or secondary route;
7: Lifetime—time which route is valid; and
8: Metric—path cost metrics.

In both of these elements a new message; the route flag, is added. The route flag is one bit of information that indicates a primary or a secondary route for either the extended RREQ or RREP IE. Also, as with any information element, a distinct IE ID is used for this extended RREQ and extended RREP. This allows any STA receiving these packets to recognize them from the (regular) RREQ and RREP packets of the state-of-the-art AODV protocol.

4.3.1 Routing CTS.

The routing CTS frame is a modified CTS frame that is used to coordinate the transmissions of the relays on the primary and secondary paths. It also serves as a grant frame to STAs that did not solicit it with a RTS frame.

FIG. 8 illustrates field contents of an extended routing CTS frame, having the following fields. Comparing this with FIG. 1, it is readily seen that this frame additionally includes the fields: SA, DA, lifetime, and time offset. It should be noted that in general four types of address fields are used in sending a frame over multiple hops, for instance SA, DA, TA, and RA. SA (Source Address) is an additional field that indicates who the frame is originated from. SA is unchanged throughout multiple hops when the frame travels over multiple hops. DA (Destination Address) is an additional field that indicates who the frame is destined to. DA is unchanged throughout multiple hops when the frame travels over multiple hops. TA (Transmitter Address) indicates who transmitted the frame physically. TA differs hop by hop when the frame travels over multiple hops. RA (Receiver Address) indicates who is supposed to receive the frame physically. RA differs hop-by-hop when the frame travels over multiple hops.

1: Frame control: contains information about the type of the frame, power management information, and so forth;
2: Duration: Duration field of the immediately previous RTS frame, minus the time, in microseconds, required to transmit the DMG CTS frame and its SIFS interval;
3: RA: MAC address of intended STA to receive this CTS frame;
4: TA: MAC address of the STA transmitting the DMG CTS frame;
5: SA: Source (originator) STA MAC address;
6: DA: Destination (final) STA address;
7: Lifetime: The time for which the STA receiving the CTS consider the data it has in its buffer to be valid;
8: Time Offset: A time offset relative to a reference time synchronization upon which transmission of data by the CTS recipient STA occurs;
9: FCS: A frame check sequence that validates the reception of the frame contents.

4.4. Selection of Spatially Uncorrelated Path Links.

In this section, a method for selection of a secondary routing path that has its links spatially uncorrelated with the links of the primary path is described. One way of estimating spatial correlation in beamformed (BF) communications is to obtain the difference between the BF sectors in the angular domain.

FIG. 9 illustrates an example topology 70 showing a primary route 72, and two possible secondary routes 76 and 78. It should be appreciated that secondary route (dotted) 78 is spatially correlated with primary route (solid) 72, as it follows a similar path, such that it may get blocked by the same blocking object 74 as was the primary path 72. A spatially independent route (dashed) 76, however, is subject to a lower probability in getting blocked by the same objects blocking the primary route. Thus, in the figure, the case is depicted in which a secondary path is selected without considering spatial correlation with the primary path. The blocking object may in this case block both the primary path and the secondary path. While another spatially independent route has a lower probability of getting blocked by the same objects blocking the primary route. A similar problem can arise when the transmitter STA or receiver STA are moving. If the secondary route is spatially correlated with primary route, both of the routes may be blocked as a result of the mobility of the STA. The information of correlation of BF patterns are obtained from the BF training data.

Figure 10:
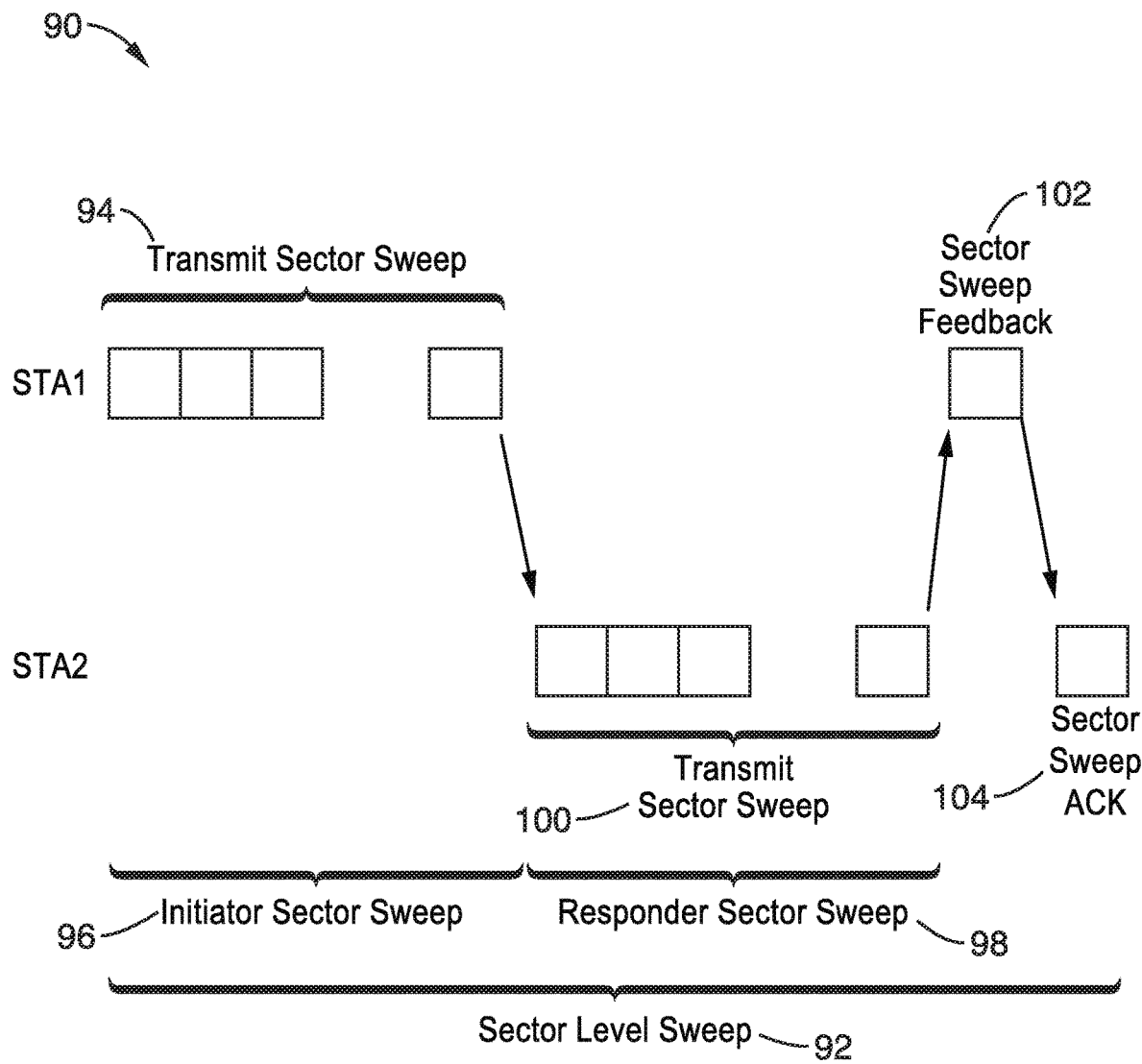
FIG. 10 is a packet transmission diagram of BF sector level sweep (SLS) utilized according to an embodiment of the technology of this disclosure.

FIG. 10 illustrates an example of BF sector level sweep (SLS) training as implemented in 802.11ad. In the figure, an example 90 is seen of BF Sector Level Sweep (SLS) 92 training as implemented in 802.11ad, showing transmit sector sweep 94 from STA 1 as an initiator sector sweep 96, followed by a responder sector sweep 98 in which STA 2 performs a transmit sector sweep 100, to which STA 1 generates sector sweep feedback 102, to which STA 2 generates a sector sweep ACK 104. The best Sector ID, Antenna ID, SNR and Beamformed link primary tenancy time information are fed back with the Sector Sweep (SSW) Feedback. STAs will learn directional transmission related information through the BF training process. The best sector ID information towards another STA is recorded and used in the spatial correlation computation.

Figure 11A:
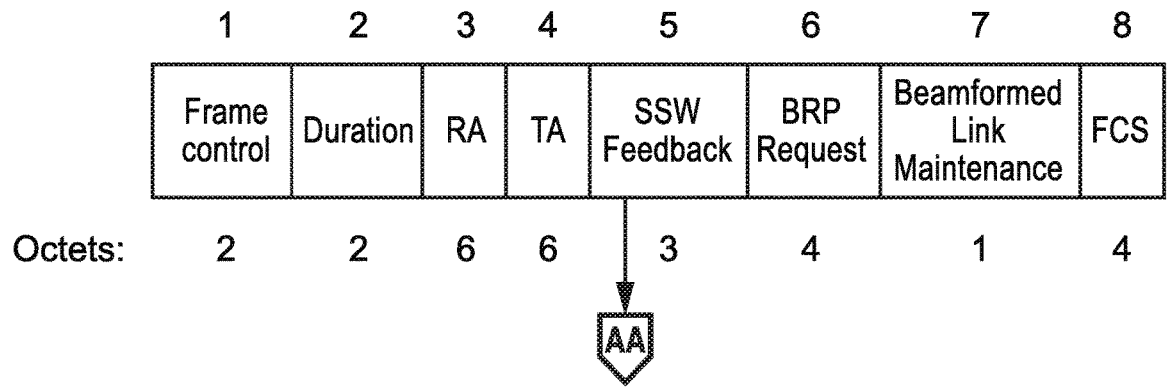
FIG. 11A and FIG. 11B are data field diagrams of an SSW feedback frame utilized according to an embodiment of the technology of this disclosure.
Figure 11B:
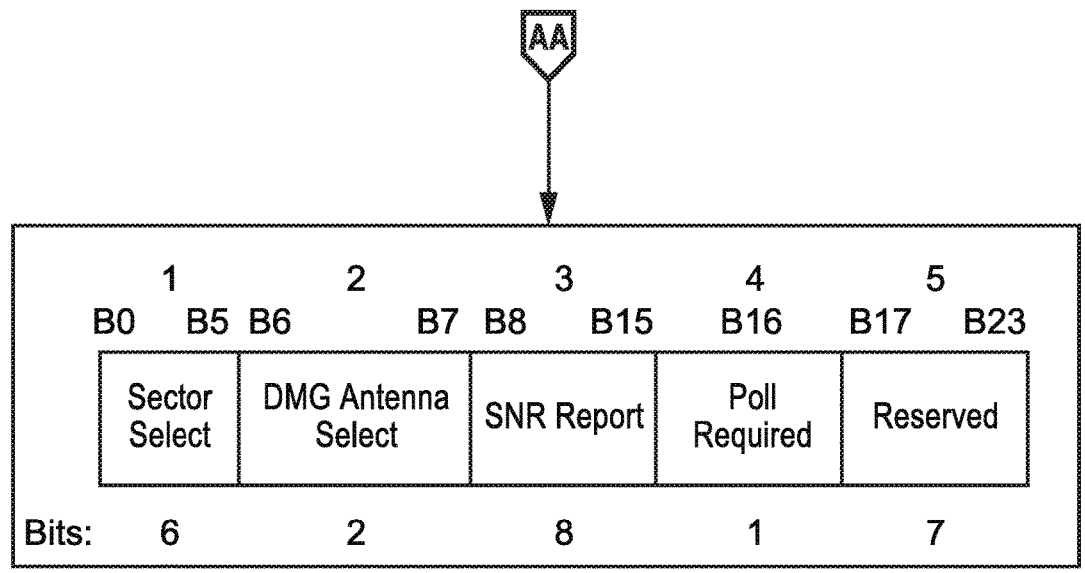
Figure 12:
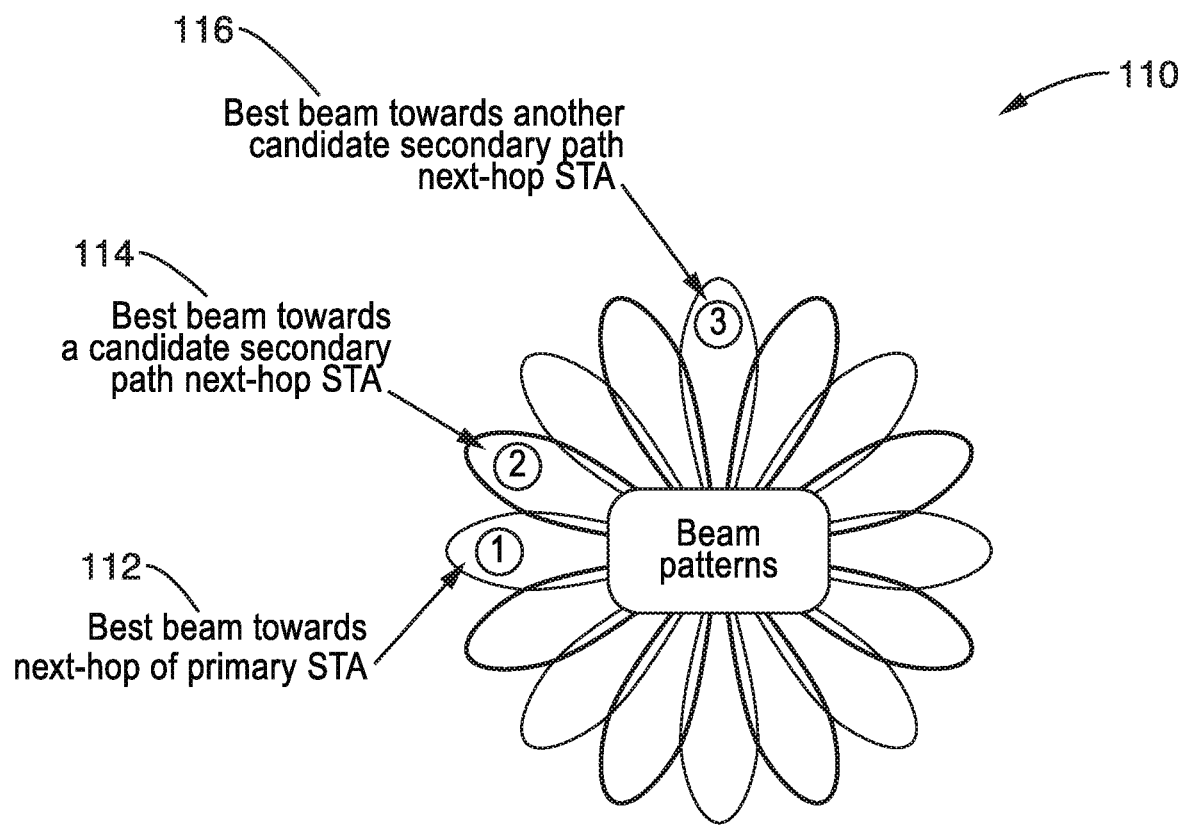
FIG. 12 is a beam pattern diagram showing use of best sector information obtained through SLS BF training as a metric for correlation of secondary routes according to an embodiment of the technology of this disclosure.

FIG. 11A and FIG. 11B illustrate conventional data structures for controlling SSW feedback. In FIG. 11A is seen an SSW feedback frame depicted with the following fields.
1: Frame Control—type of frame, power management. etc.
2: Duration
3: RA—Receive Address
4: TA—Transmit Address
5: SSW Feedback
6: BRP Request
7: Beamformed Link Maintenance
8: FCS In FIG. 11B are shown the subfields in the SSW feedback field.
1: Sector Select
2: DMG Antenna Select
3: SNR Report
4: Poll Required
5: Reserved FIG. 12 illustrates beam pattern lobes 110 of a STA in mmWave communications. Best sector information obtained through SLS BF training is utilized as a metric for correlation of secondary routes with the primary route. In the figure the best sector towards the next-hop STA in the primary path is shown, with: (1) section 112 having limited angular separation from another best sector, which is section (2) 114, of around 22 degrees on the horizontal plane; while section (3) 116 has around 90 degrees separation from sector (1) 112. As a result, the system is configured toward choosing a STA towards which sector (3) as the best sector for a preferred next-hop secondary path. Greater angular separation generally leads to improved node separation and thus improved independence.

4.5. Routing Protocol Description.
4.5.1. Protocol Operation.

Figure 13:
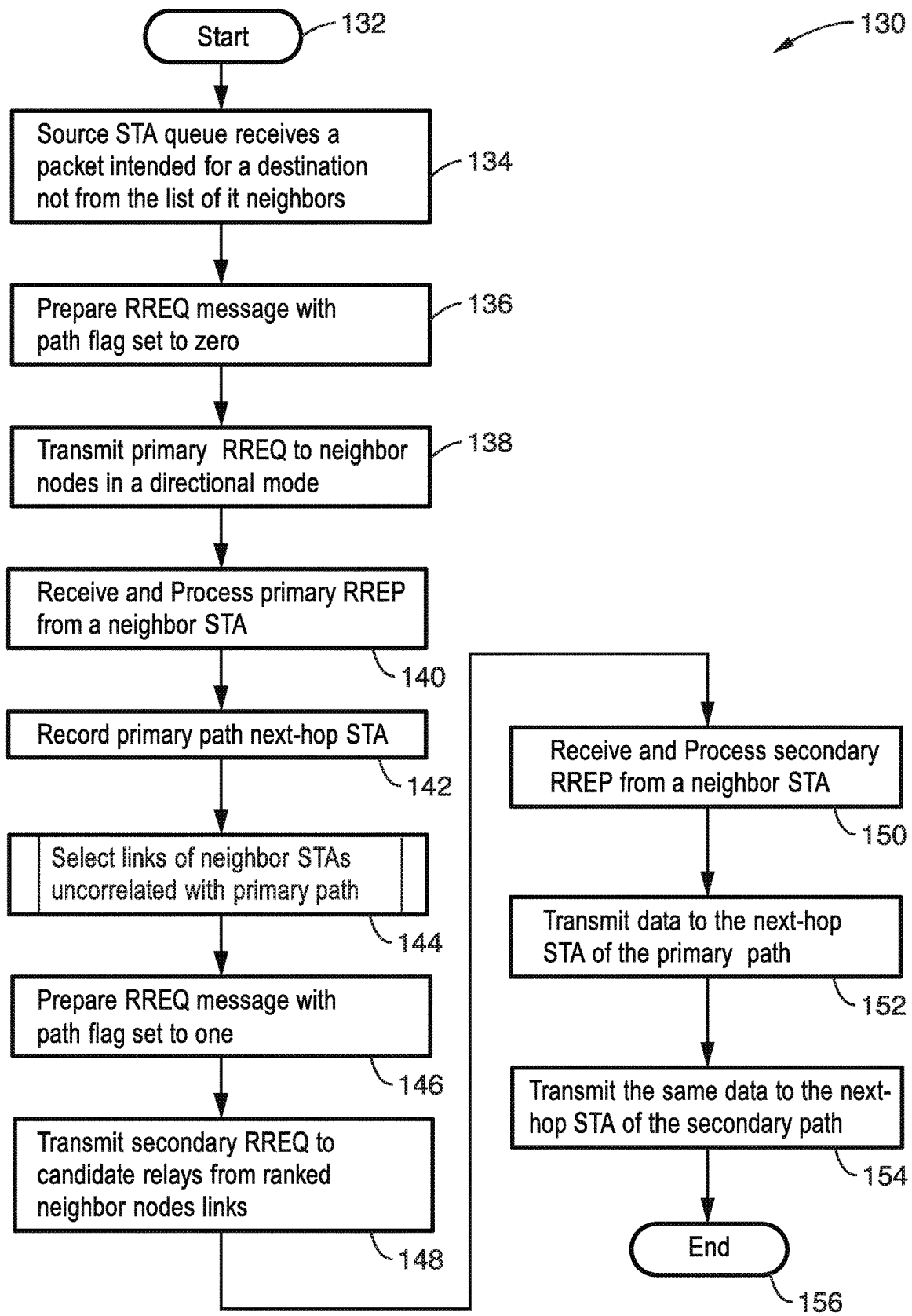
FIG. 13 is a flow diagram of a routing protocol performed in a source station routing to secure both primary and secondary routes for the same data according to an embodiment of the technology of this disclosure.

FIG. 13 illustrates an example embodiment 130 of the disclosed routing protocol in which the source STA seeks to secure primary and secondary routes. It should be noted that this flow diagram only depicts operations from the standpoint of the source STA, not the activities occurring at intermediate STAs and the destination STA. The baseline routing protocol is an AODV which is tailored for directional transmissions according to the technology of this disclosure. The protocol is triggered 132 by the source STA, as it is an on-demand routing protocol, whereupon receiving 134 a packet intended for a destination which is not found in the list of its neighbors. The source STA can start the routing protocol by setting the route flag to primary (e.g., 0) and creating 136 and sending (transmitting) 138 the extended RREQ to the neighbor STAs in a directional mode. The primary route rules at the source STA, destination STA and the intermediate STAs (possible relays) follow those of the baseline routing protocol. A reply is received 140 and processed from a neighbor STA, in which the primary path next hop is recorded 142.

After the primary route is secured, the source STA triggers the path discovery of a secondary route. The secondary route is selected to be spatially uncorrelated with the primary route, this commences with selecting 144 links of neighbor STAs uncorrelated with the primary path. This step is depicted in greater detail in FIG. 15. The path flag is set to secondary (e.g., one) and an RREQ is prepared 146, and sent (transmitted) 148 to candidate relays from ranked neighbor nodes. In response to this, a response (RREP) is received from a neighbor node 150 and processed to set the secondary path. The source station transmits 152 data along the primary path to the next-hop station, and also transmits 154 data along the secondary path to the next-hop STA, after which this processing ends 156.

Figure 14:
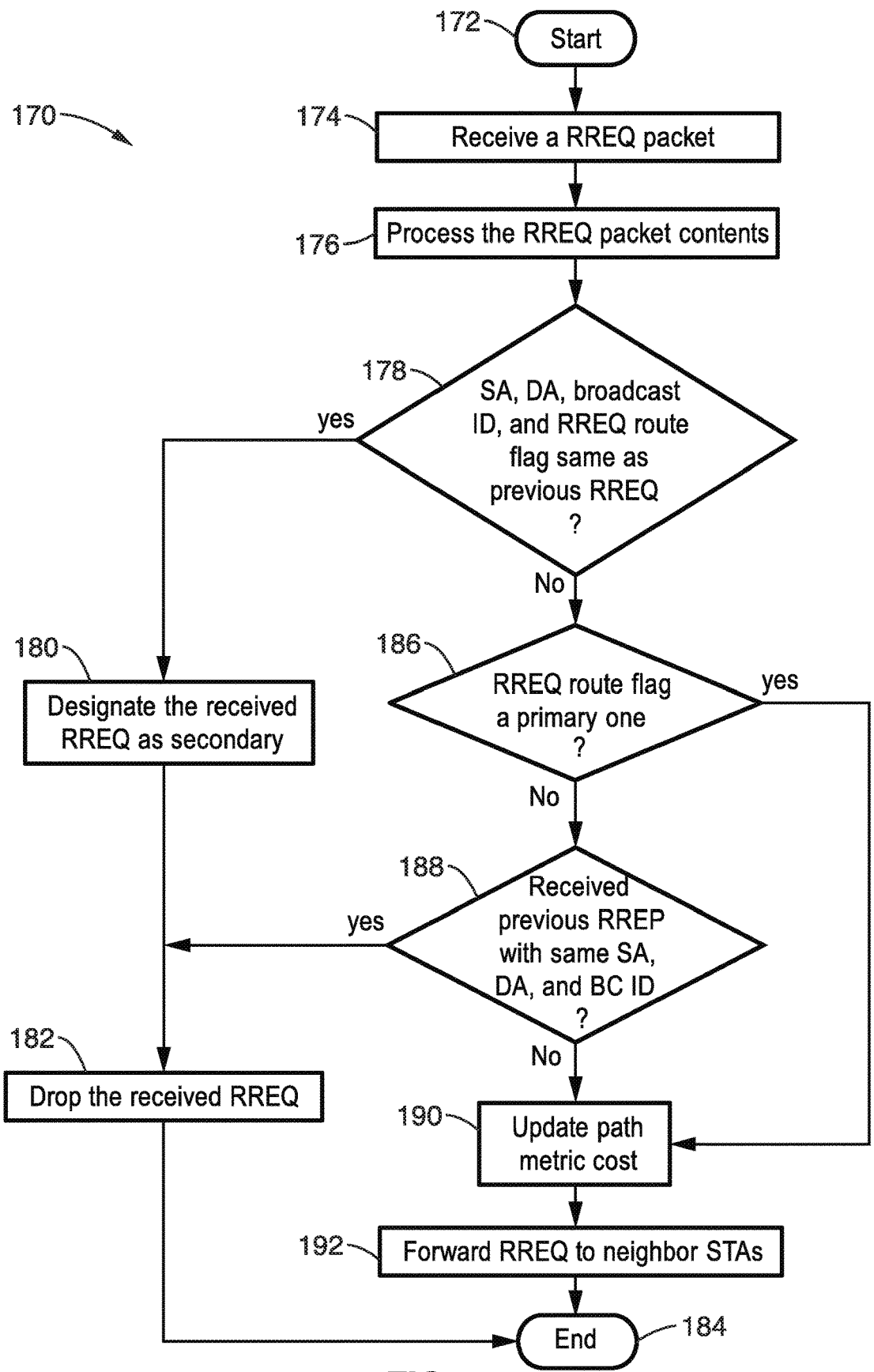
FIG. 14 is a flow diagram of processing an RREQ at intermediate nodes with primary and secondary path discovery according to an embodiment of the technology of this disclosure.

FIG. 14 illustrates an example embodiment 170 of processing an RREQ at intermediate nodes with primary and secondary path discovery. The intermediate STAs and the destination follow different rules when receiving the secondary RREQ in order to discover an end-to-end route that is not overlapped with the primary route, as seen in the figure. Process commences 172 with an RREQ being received 174 and processed 176 at this intermediate node. A check is made 178 of SA, DA, broadcast ID and RREQ route flag to determine if these are the same as the previous RREQ. If they are the same, then the received RREQ is designated 180 as secondary, the RREQ is then dropped 182 to end 184 the process. Otherwise, if in block 178 these fields are not the same as the previous RREQ, then block 186 is executed to check if the RREQ flag is set to primary. If it is not set to primary, then block 188 performs a check if the received previous RREP has same SA, DA, and BC ID. If previous RREP had these same field values, then a jump to block 182 is made to drop the RREQ, and end 184 the process. Otherwise, if either the route flag checked in block 186 is primary, or the previous RREP checked in block 188 did not have the same values, then block 190 is executed to update the path cost metric, and to forward the RREQ to neighbor STAs 192 then end 184 the process.

4.5.2. Link Selection STAs Uncorrelated with Primary Path.

The source STA after securing the primary path prepares the secondary RREQ to be transmitted to some selected neighbor STAs. As explained previously, BF training information is retrieved to preclude selecting a STA that has a best sector that is highly correlated with the best sector to the primary path next-hop relay.

Figure 15:
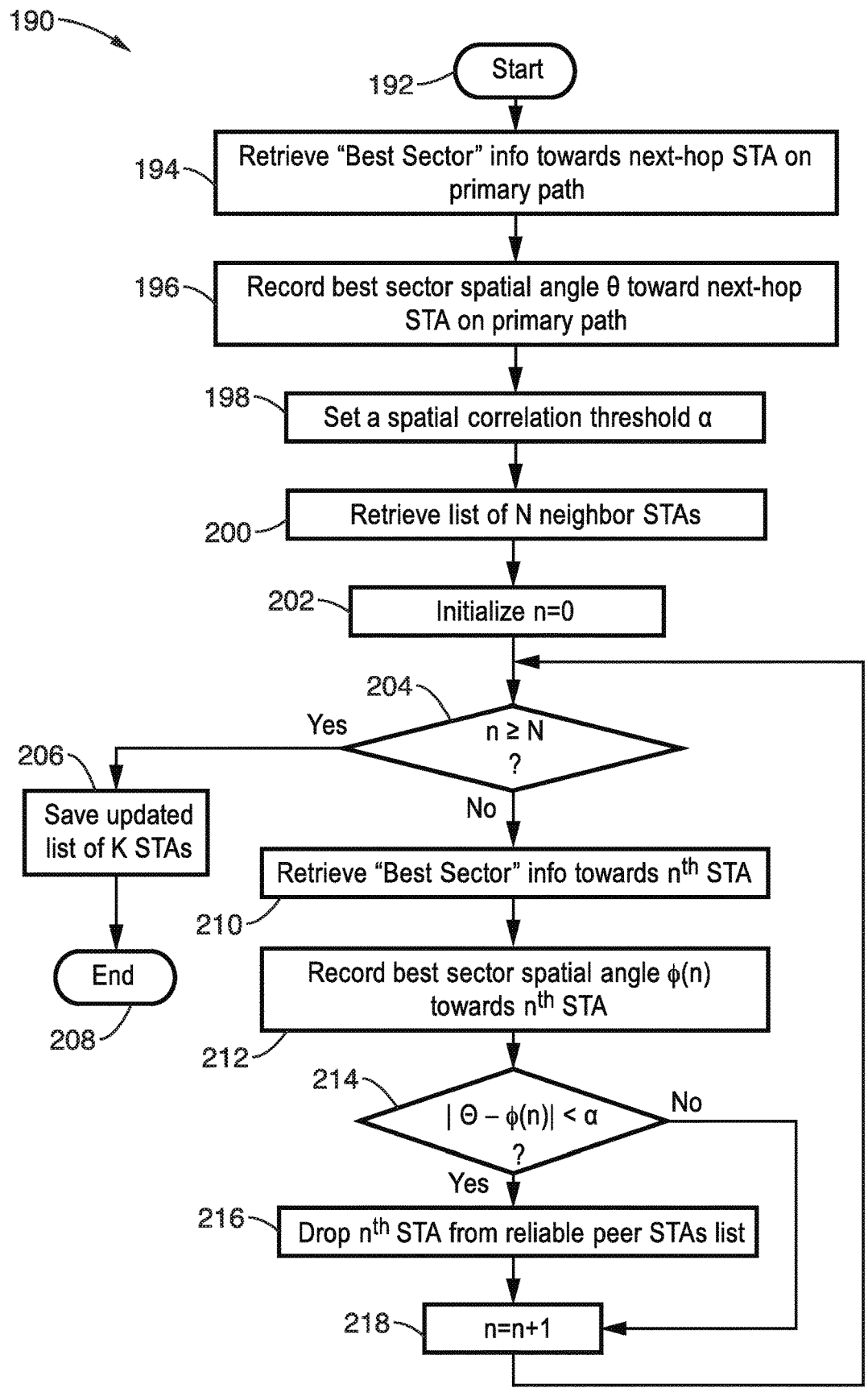
FIG. 15 is a flow diagram of selecting secondary links from neighbor stations which are uncorrelated with the primary path as performed according to an embodiment of the technology of this disclosure.

FIG. 15 illustrates this process 190 of selecting links of neighbor STA which are uncorrelated with the primary path. The process commences 192 with best sector information retrieved 194 toward the next hop STA on the primary path. Then best sector spatial angle θ is recorded 196 toward next hop STA on the primary path. A spatial correlation threshold α is set (or was previously set) 198, then a list of N neighbors is retrieved 200, with a local list (loop counter) being initialized 202. A loop check 204 is made (alternatively check can be at bottom of loop) if the local loop has been performed for all of the N neighbors; if yes, then block 206 is executed to save the updated list of K STAs, and end the process 208. Otherwise, the loop is executed and best sector information is retrieved 210 toward the nth STA, and best sector spatial angle φ(n) towards the nth STA is recorded 212. A check is then made 214 if the absolute value of spatial angle θ–φ (n) is less than spatial correlation threshold α. If the spatial angle is not less, then the STA is acceptable (will remain on the list) and a jump is made to block 218 to increment the loop counter and jump back to block 204 at the top of the loop. Otherwise, with a non-sufficiently diverse angle, block 216 is executed which drops nth STA from the reliable peer STA list, before returning to the top of the list.

Figure 16:
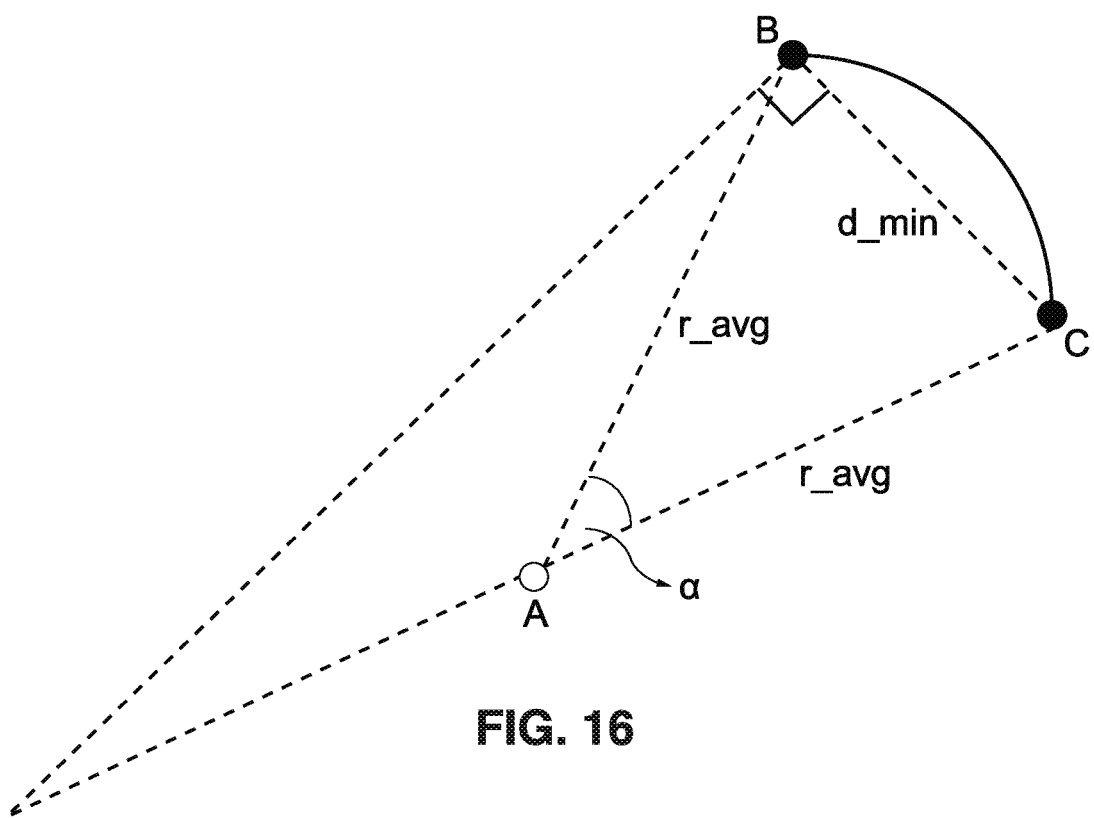
FIG. 16 is a geometric depiction of secondary route selection utilized according to an embodiment of the technology of this disclosure.

FIG. 16 is a geometric depiction 230 of this route selection process, in relation to STAs A, B and C, based on the angles. It can be seen that angle α can selected based on the minimum distance d_min between two STAs that assumes blockage on one would not affect the other STA. In the figure, the value r_avg is an average distance between a transmitting STA "A" and two candidate relays "B" and "C". For example if d_min=0.5 meters and r_avg=2 meters, then from basic geometry, using the inscribed angle conjecture and Thales' Theorem:

$$\alpha = 2 * \sin^{-1} \frac{d\_min}{2 * r\_avg}$$

In this example α is approximately 15 degrees.

This threshold α is utilized to compare the best sector horizontal angle towards the relay on the primary path, θ, with the best sector horizontal angle towards the nth candidate relay on a secondary path, φ(n). At the end of this procedure K STAs out of N reliable STAs are assumed to have spatially uncorrelated links with the link of the primary path relay.

Figure 17A:
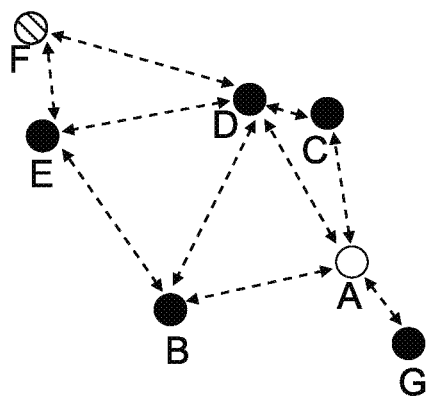
FIG. 17A through FIG. 17E are topology diagrams showing stages of routing the same data along primary and secondary paths according to an embodiment of the technology of this disclosure.
Figure 17B:
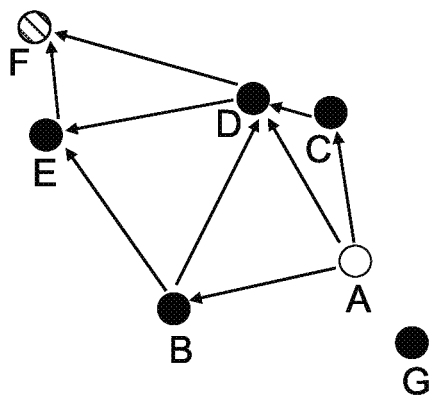
Figure 17C:
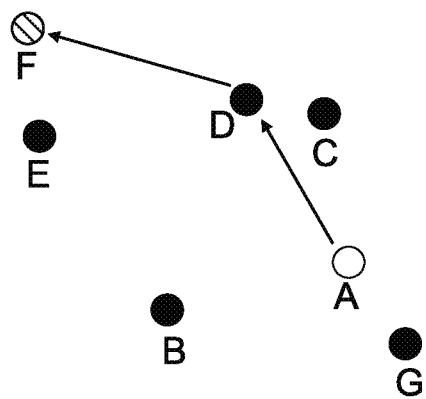
Figure 17D:
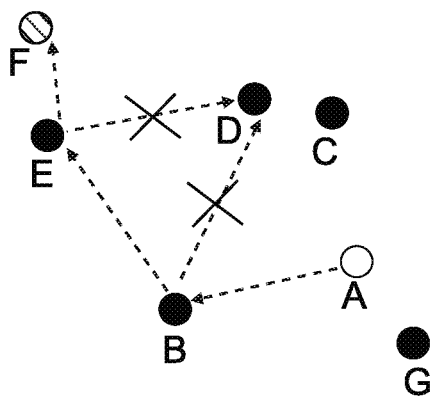
Figure 17E:
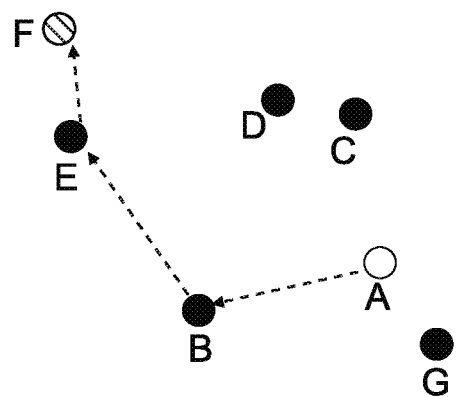

FIG. 17A through FIG. 17E illustrate applying the disclosed routing protocol on an example mmWave mesh network, shown with STAs A-G. In particular, the figures depict and example of primary and secondary path discovery on the network showing bidirectional links between STAs in FIG. 17A. The propagation of a primary RREQ (solid) is shown in FIG. 17B. The primary route is selected as seen in FIG. 17C. Propagation of the RREQ for the secondary path (dashed) according the rules explained in the current embodiments is seen in FIG. 17D, with the cross sign referring to dropping of the RREQ packet at the receiving STA. In FIG. 17E a secondary route is seen selected.

Thus, in the above figures an example mesh network demonstrated STAs exchanging data using the disclosed routing protocol. First, an extended RREQ with primary flag is propagated (from STA A in FIG. 17B) to enable discovery of the primary path. After the reception of RREP at the source and securing the discovery of the primary path discovery (seen in FIG. 17C), the secondary path RREQ is propagated (FIG. 17D). In the figure, the source STA (STA A) opted not to send the secondary RREQ to STA C as the link to STA C has high spatial correlation with the link to STA D on the primary path. In addition, intermediate STAs on the primary path are configured to drop any received RREQ for the secondary path, which is depicted with the cross signs, for the secondary path RREQ arriving at STA D. Upon securing the secondary path (FIG. 17E) through the use of the proposed routing protocol, the same data content is transmitted in the two routes simultaneously.

The disclosed routing protocol is expected to increase the robustness and reliability of routing data despite link blockage, antenna misalignments, channel fading effects, and similar instances which reduce signal levels.

5. Data Reception from Two Routes at the Destination STA.

5.1. Uncoordinated Reception.

The simplest method for the destination STA to process the data contents from the two routes is to receive the data without any form of coordination. The higher layers of the OSI model will detect any duplication in the packets and duplicate packets can be dropped.

Figure 18:
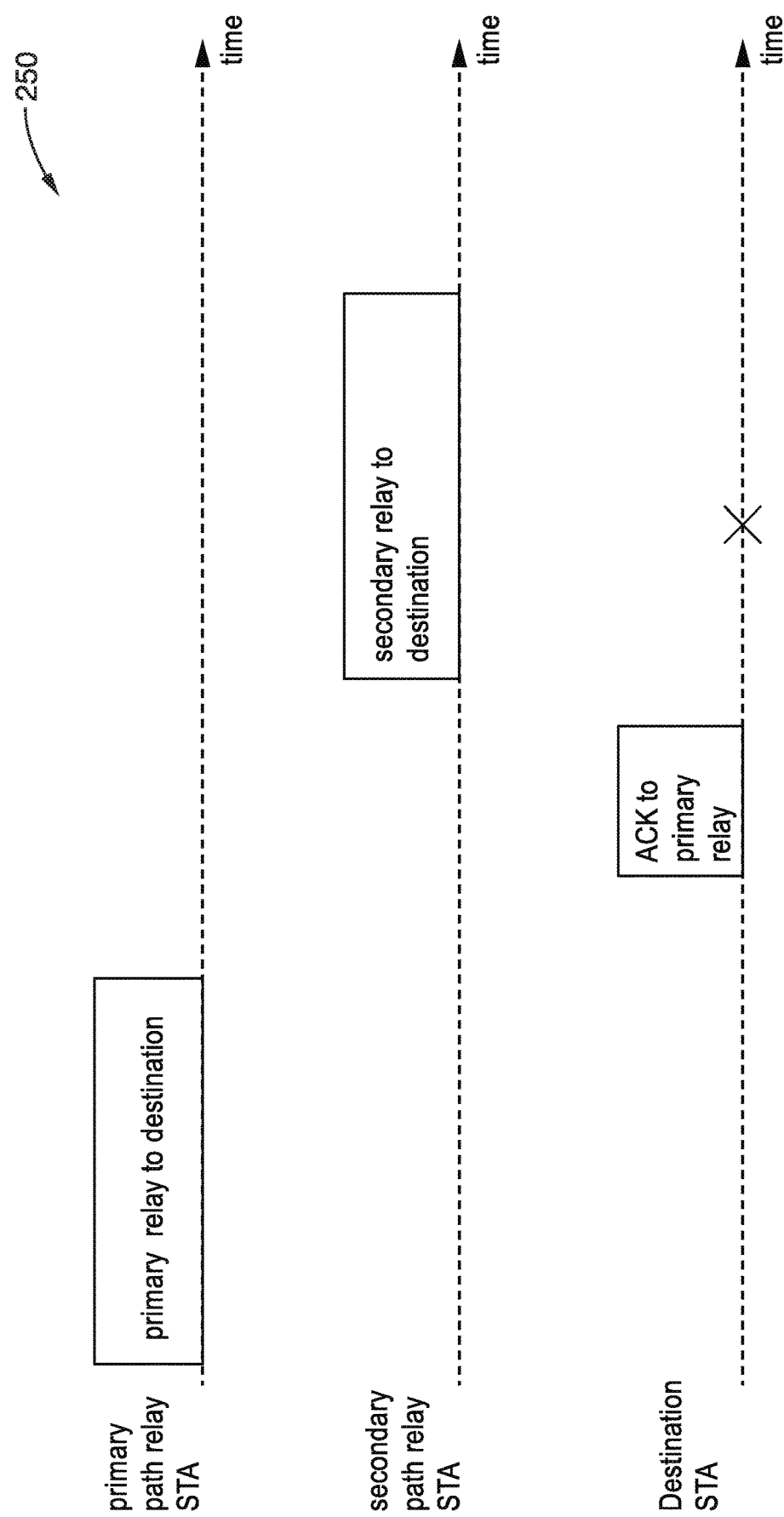
FIG. 18 is a data transmission diagram showing data transmission by last hop relays on the primary and secondary paths according to an embodiment of the technology of this disclosure.

FIG. 18 depicts the data transmission by the last-hop relay on the primary path and the last-hop relay on the secondary path and the acknowledgment sent by the destination. These transmissions are uncoordinated. The packets received at the destination from the last-hop relay on the secondary path are designated duplicate and dropped, depicted by the cross sign in the figure. These packets have been correctly received by the destination STA from the primary path.

5.2. Coordinated Reception—Combining Received Signal Power.

The reception of the data contents from the two routes at the destination STA can be coordinated. In at least one embodiment, the disclosure achieves coordination by enabling the combination of the received signals from the last-hop relays at the physical layer. This combination improves the overall received signal strength and thus decreases the chances of reception errors.

Figure 19:
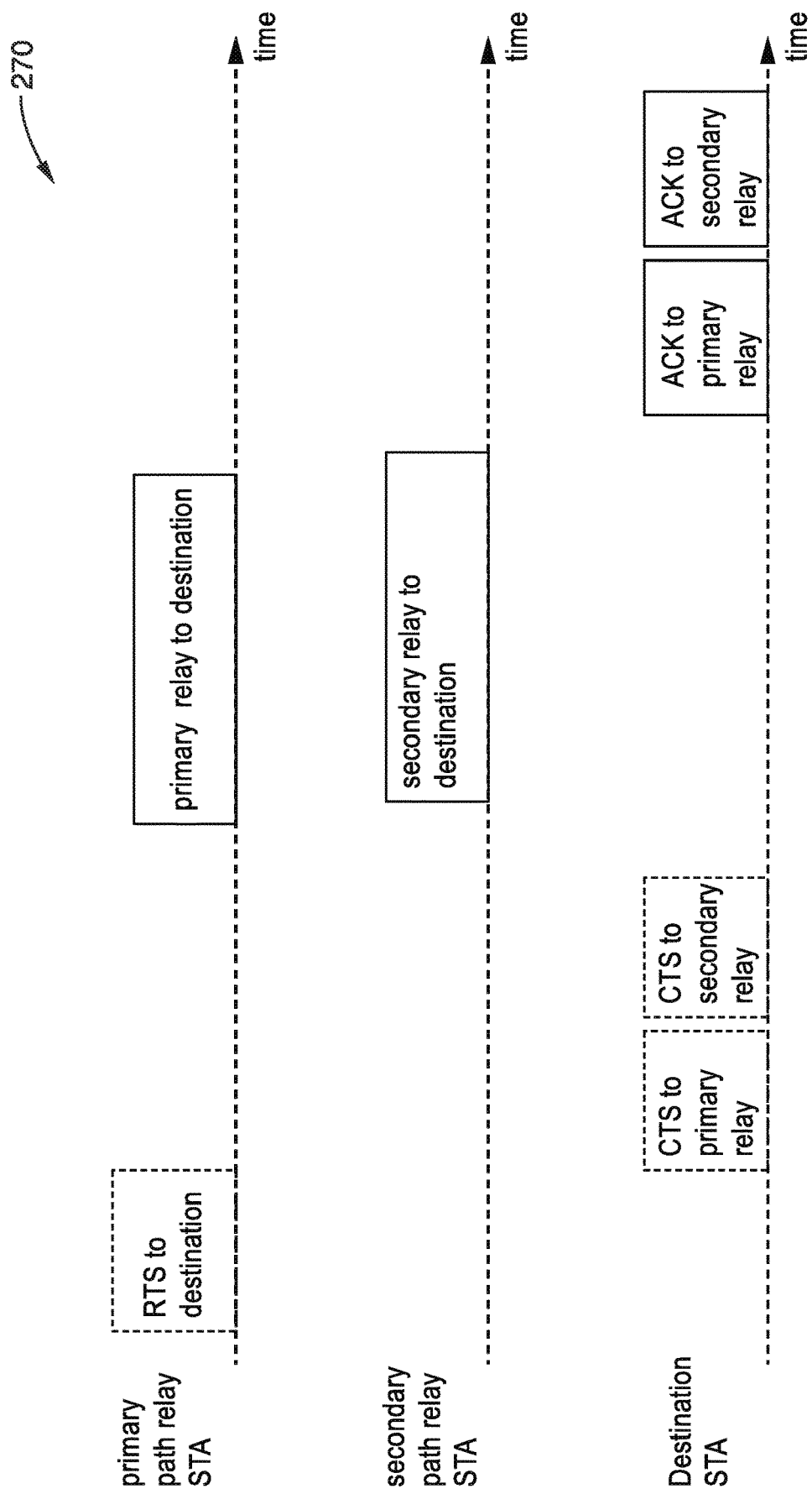
FIG. 19 is a data transmission diagram showing use of RTS/CTS on the primary and secondary paths according to an embodiment of the technology of this disclosure.

FIG. 19 depicts the coordination of these data transmissions. A RTS is sent by primary relay, to which a destination responds by a CTS frame to both relays. The CTS frame specifies the transmission time given the knowledge of the propagation time between the destination and both relays and the time consumed in the handshaking process. This handshaking process allows reception of the two signals from both relays almost at the same exact time. The messaging needed for this type of coordination is depicted in the next figure.

Figure 20:
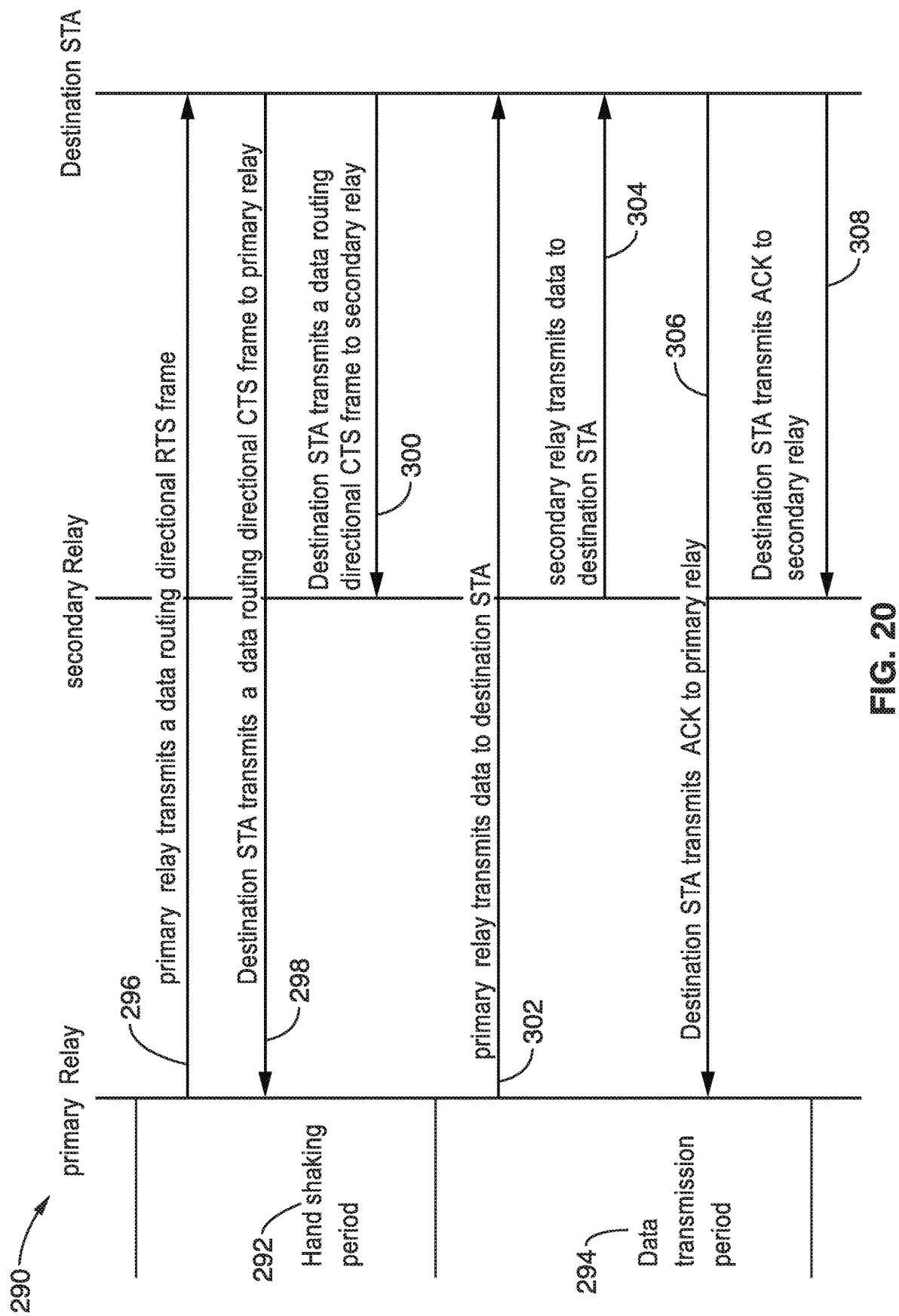
FIG. 20 is a message flow diagram showing handshaking for coordinating between primary relay, secondary relay and destination according to an embodiment of the technology of this disclosure.

FIG. 20 illustrates messaging flow 290 for performing the above form of coordination between primary relay, secondary relay, and destination STA, in performing a handshaking period 292 and data transmission period 294. During handshaking 292, the primary relay transmits 296 a data routing directional RTS frame. The destination STA transmits 298 a data routing directional CTS frame to the primary relay. The destination STA transmits 300 a data routing directional CTS frame to secondary relay. In the data transmission period 294, the primary relay transmits 302 data to the destination STA. The secondary relay transmits 304 data to the destination STA. The destination STA transmits an acknowledgement (ACK) 306 to the primary relay. The destination STA transmits an acknowledgement (ACK) 308 to the secondary relay.

Figure 21A:
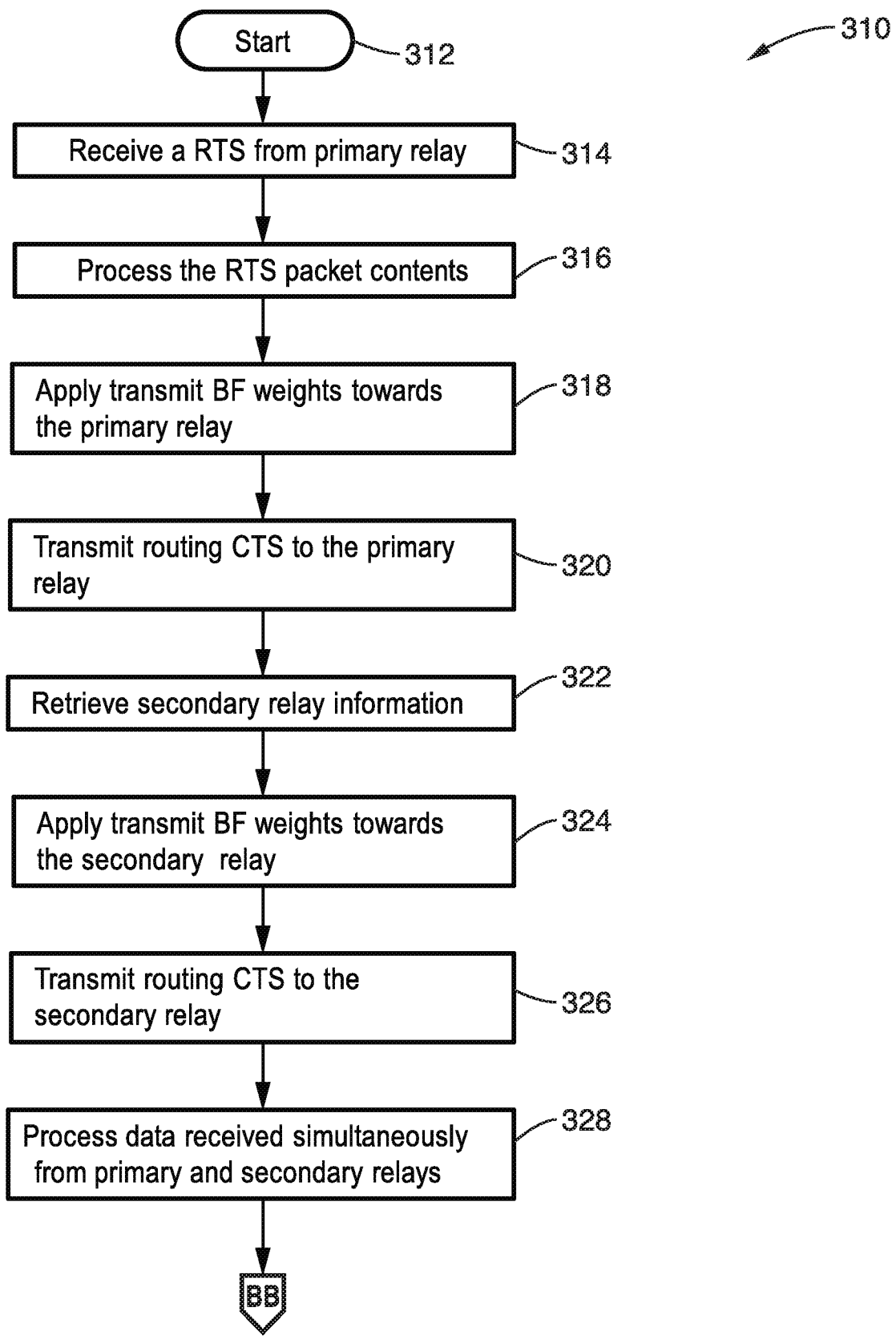
FIG. 21A and FIG. 21B are a flow diagram of simultaneous data packet reception at the destination STA from the primary and secondary relays according to an embodiment of the technology of this disclosure.
Figure 21B:
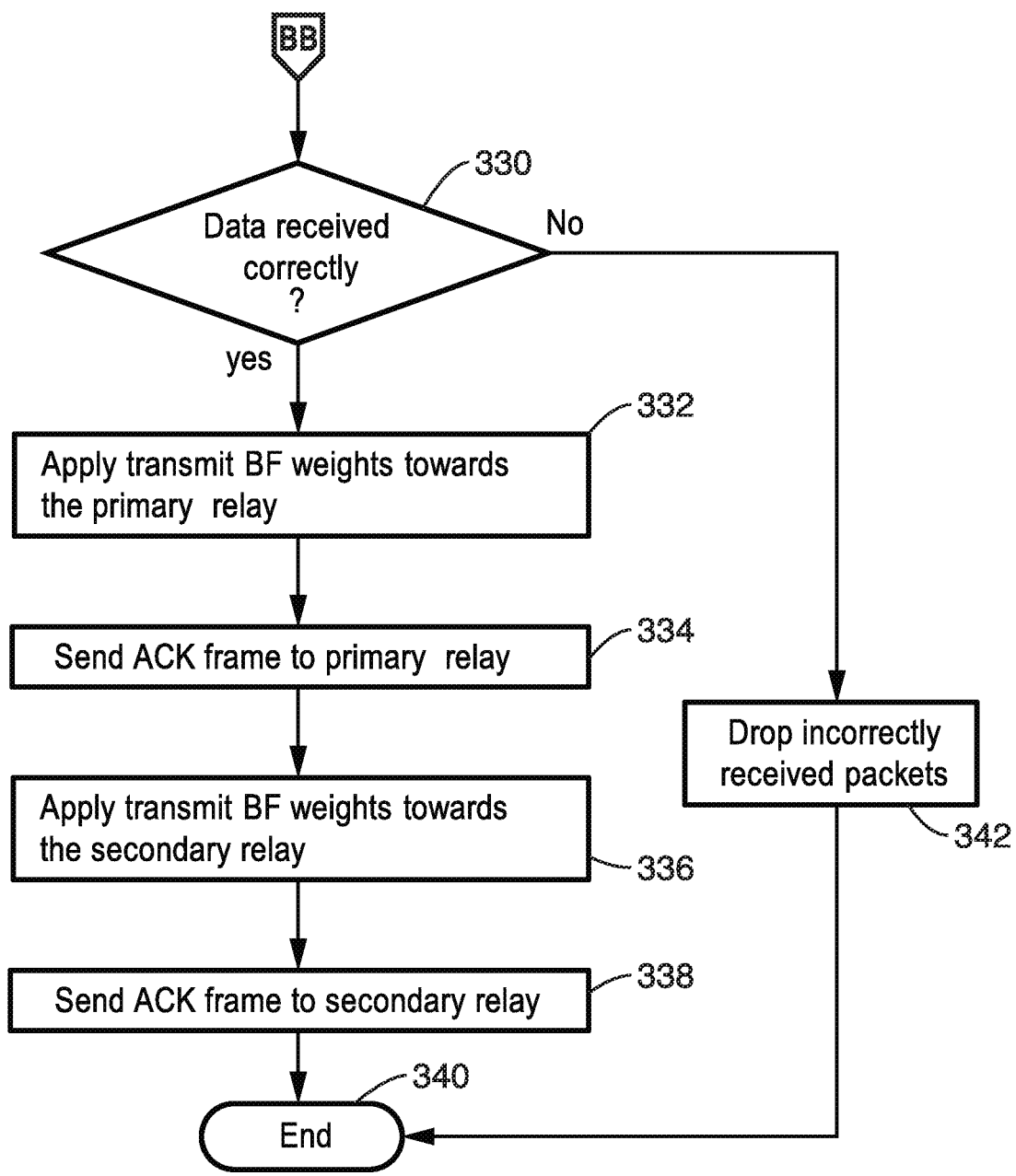

FIG. 21A and FIG. 21B illustrate an example embodiment 310 of logic (programming) implemented at the destination STA showing simultaneous data packet reception at the destination STA from the primary and secondary relays. Execution starts 312 in FIG. 21A with an RTS received 314 from a primary relay, and is processed 316. The destination STA then applies BF weights 318 toward the primary relay. A routing CTS is then transmitted 320 to the primary relay. Then secondary relay information is retrieved 322, to which transmit BF weights are applied 324, upon which the routing CTS is transmitted 326 to the secondary relay. Data is received and processed 328 from the primary and secondary relays. Then in FIG. 21B, a check is made 330 if the data was received correctly. If it was received correctly, then transmit BF weights are applied 332 toward the primary relay, and an ACK frame is sent 334 to the primary relay. Similarly, BF weights are applied 336 toward the secondary relay, and an ACK frame is sent 338 to the secondary relay, to end the process 340. Returning to block 330, if the data was not received correctly, then the incorrectly received packets are dropped 342, and the process ends 340.

5.2. Coordinated Reception—Conditional Reception from Secondary Route.

Figure 22B:
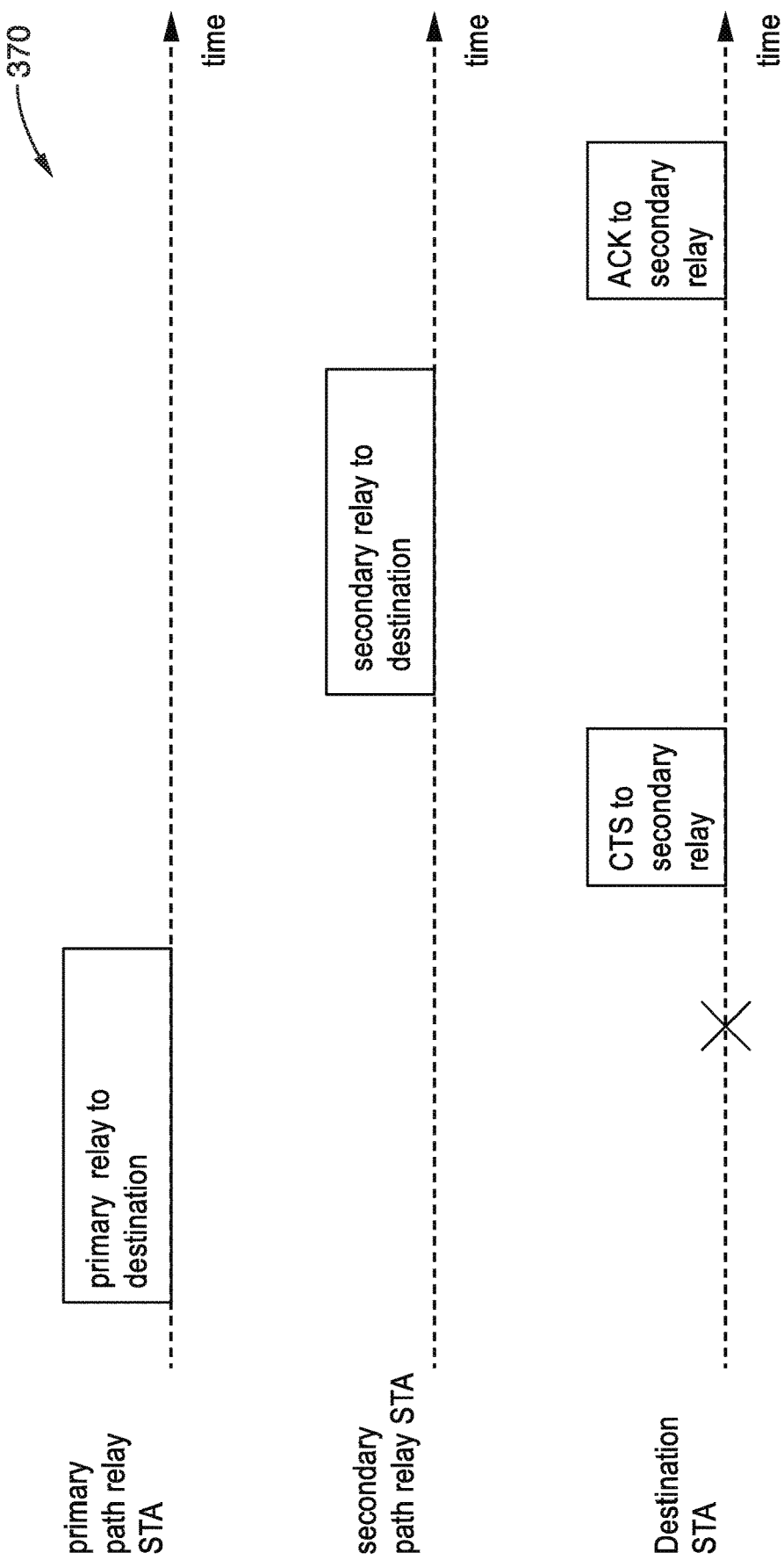

FIG. 22A and FIG. 22B illustrate example embodiments 350, 370 of transmissions by the primary relay, destination STA, and secondary path relay. In FIG. 22A, data is shown being received correctly by the primary path relay at the destination. In FIG. 22B data transmission by the secondary path relay is shown being triggered since the data reception from the primary relay was deemed a failure by the destination STA.

The above example depicts another form of coordination of the reception of the data contents from the two routes at the destination STA. If the destination STA correctly receives the data packets from the relay of the primary path, then it acknowledges this reception to the relay on the primary path. The relay on the secondary path drops the packets since it did not receive a solicitation of communications. This condition is seen in the FIG. 22A. On the other hand, if the data is received in error at the destination from the primary relay, then the destination STA solicits the relay on the secondary path through a CTS frame to transmit the data packets as depicted in FIG. 22B.

Figure 23:
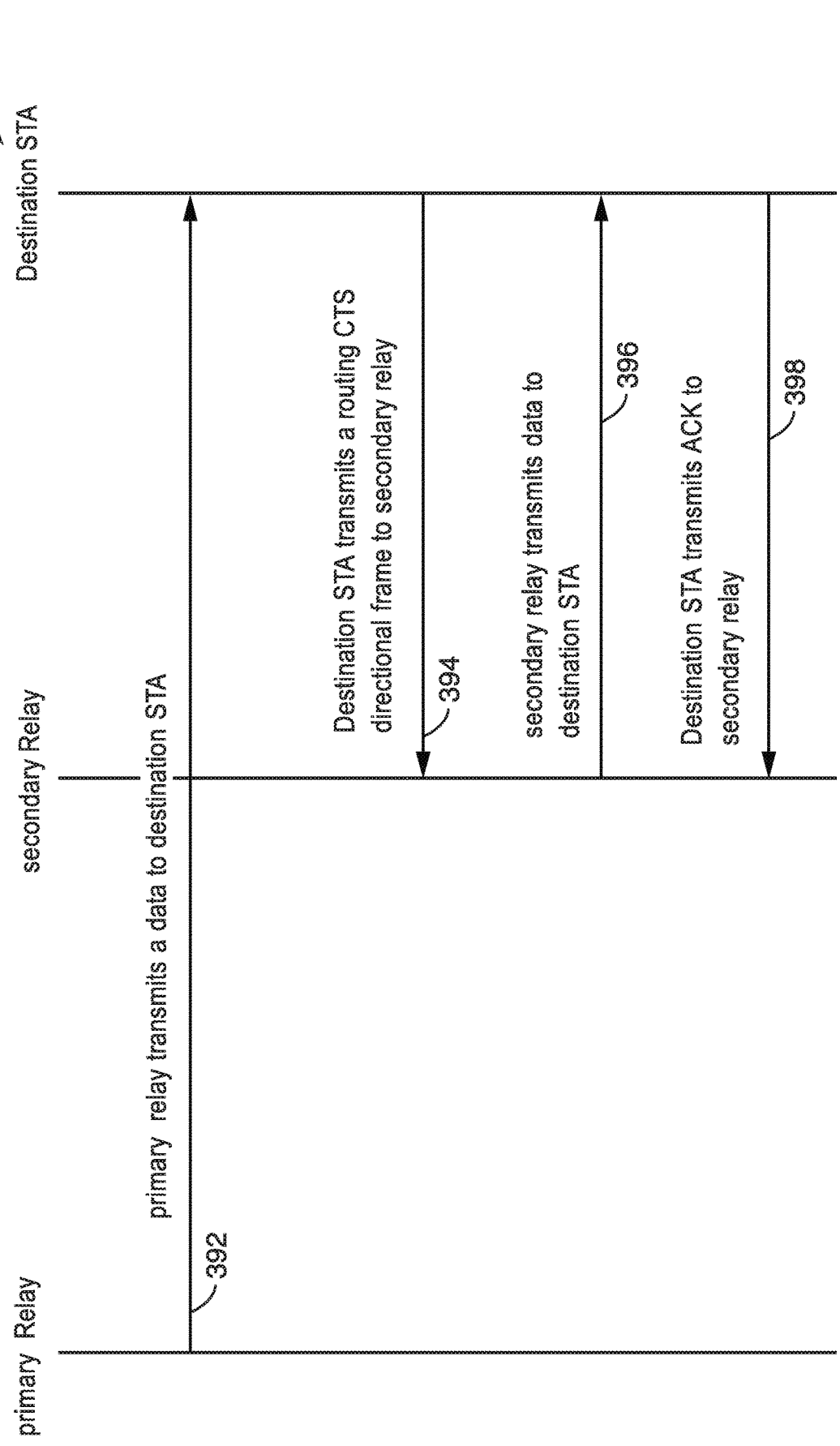
FIG. 23 is a message flow diagram of data transmission by the secondary path relay when the transmission by the primary path relays fails, as utilized according to an embodiment of the technology of this disclosure.

FIG. 23 illustrates a messaging sequence 390 for data transmission by the secondary path relay when the transmission by the primary path relay fails. At the top of the figure is seen the primary relay, secondary relay, and destination STA. The primary relay transmits 392 data to a destination STA, in response to which the destination STA transmits 394 a routing CTS directional frame to a secondary relay. This secondary relay transmits 396 data to the destination STA, which then sends an ACK back 398 to the secondary relay.

Figure 24A:
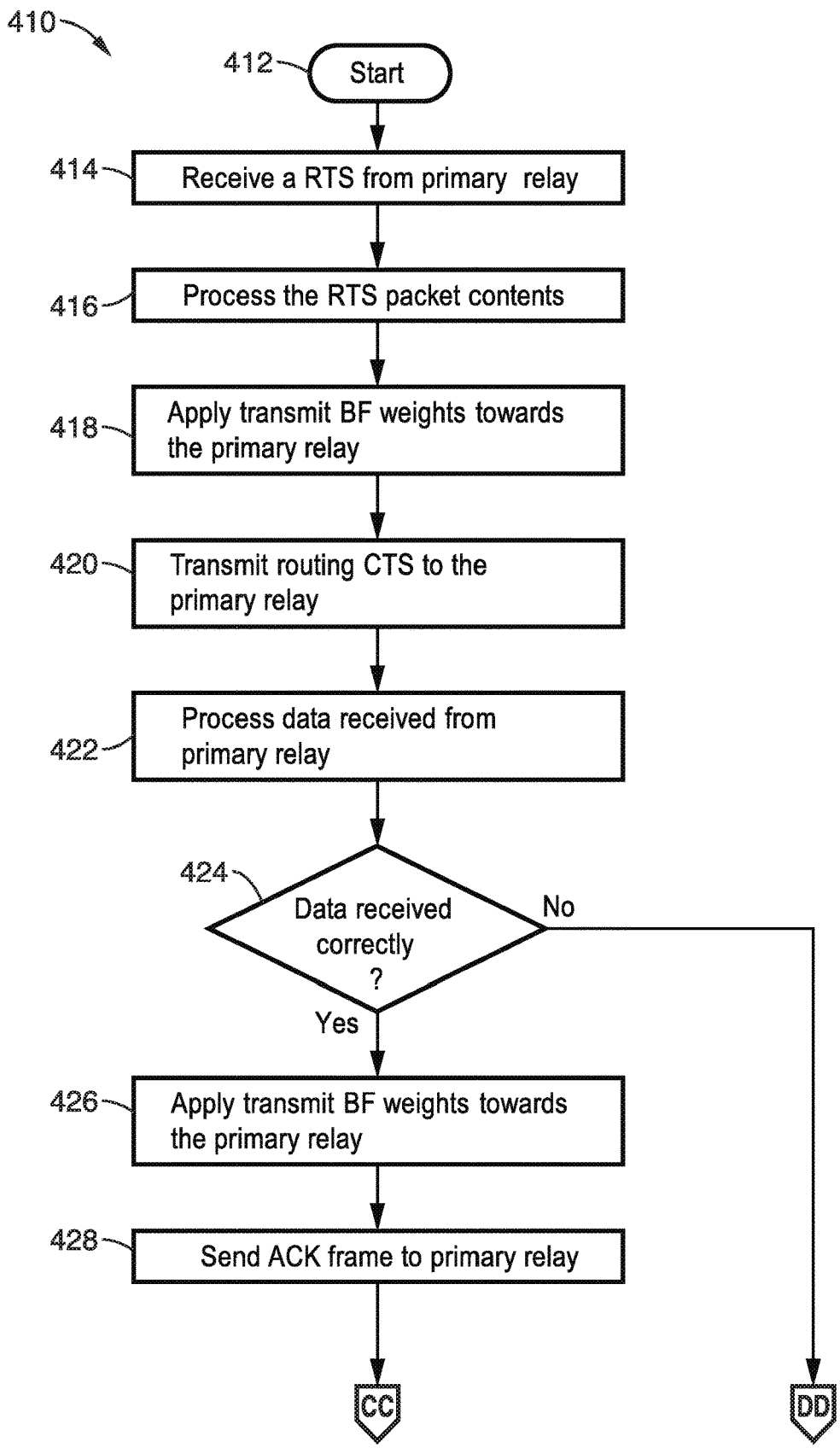
FIG. 24A and FIG. 24B are a flow diagram of conditional data packet reception at the destination STA from the secondary STA according to an embodiment of the technology of this disclosure.
Figure 24B:
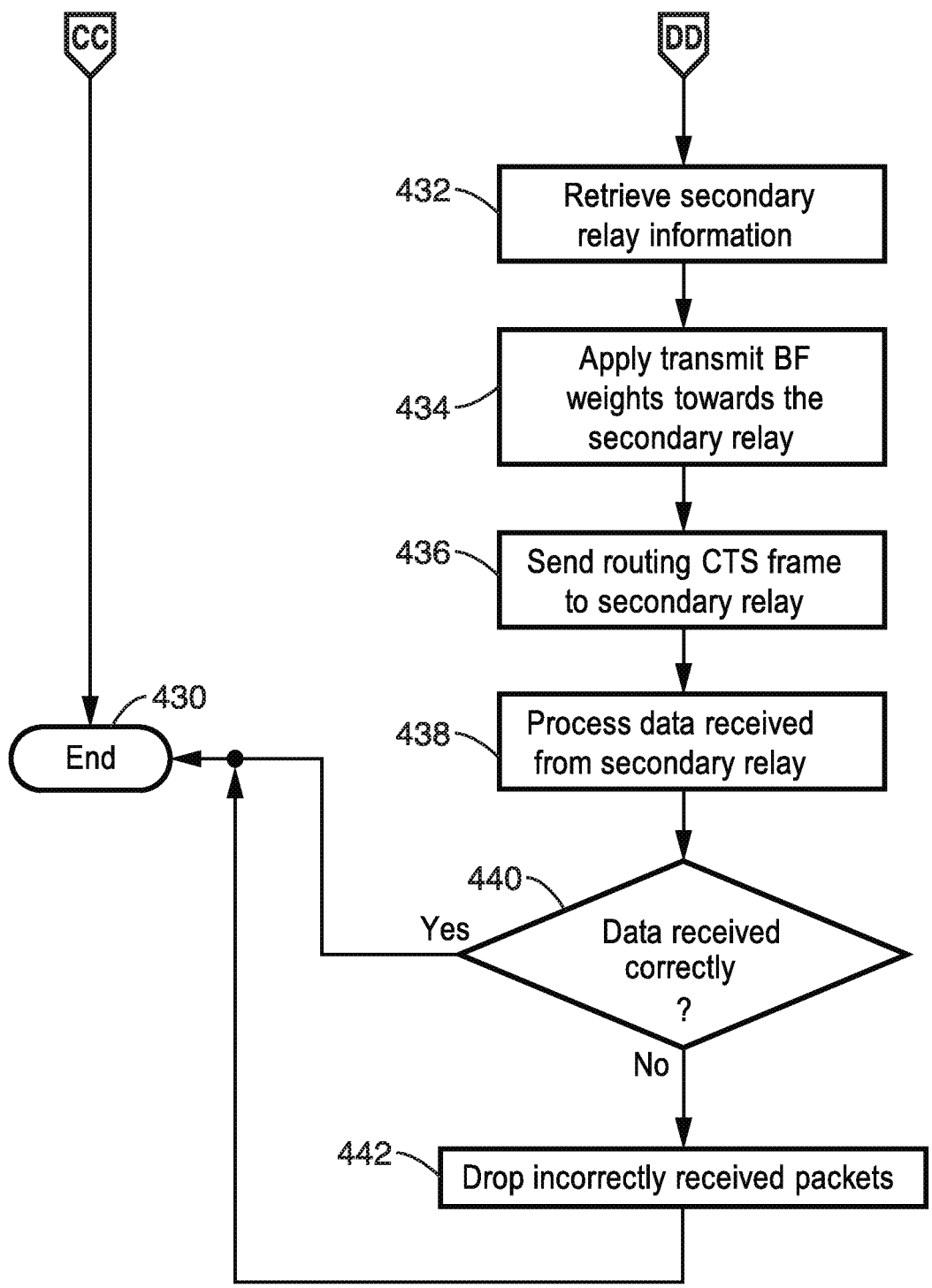

FIG. 24A and FIG. 24B illustrate an example embodiment 410 of conditional data packet reception at the destination STA from the secondary STA. Processing commences 412 in FIG. 24A with RTS received 414 from a primary relay, and its RTS packet contents processed 416. Transmit BF weights are applied 418 toward the primary relay, and transmitted 420 to the primary relay. Data is then processed 422 from the primary relay. A check is made 424 to determine if the data was received correctly. If correctly received, then transmit BF weights are applied 426 toward the primary relay, and an ACK frame sent 428 to the primary relay before the process ends 432 as seen in FIG. 24B. Otherwise, if the data was not correctly received at block 424, then secondary relay information is retrieved 432 in FIG. 24B, transmit BF weights applied 434 toward secondary relay, and a routing CTS frame sent 436 to the secondary relay. Data is received and processed 438 from the secondary relay, and a check is made 440 if the data was received correctly. If it was correctly received, then processing ends 430. Otherwise, the incorrectly received packets are dropped 442 before ending processing 430.

Figure 25:
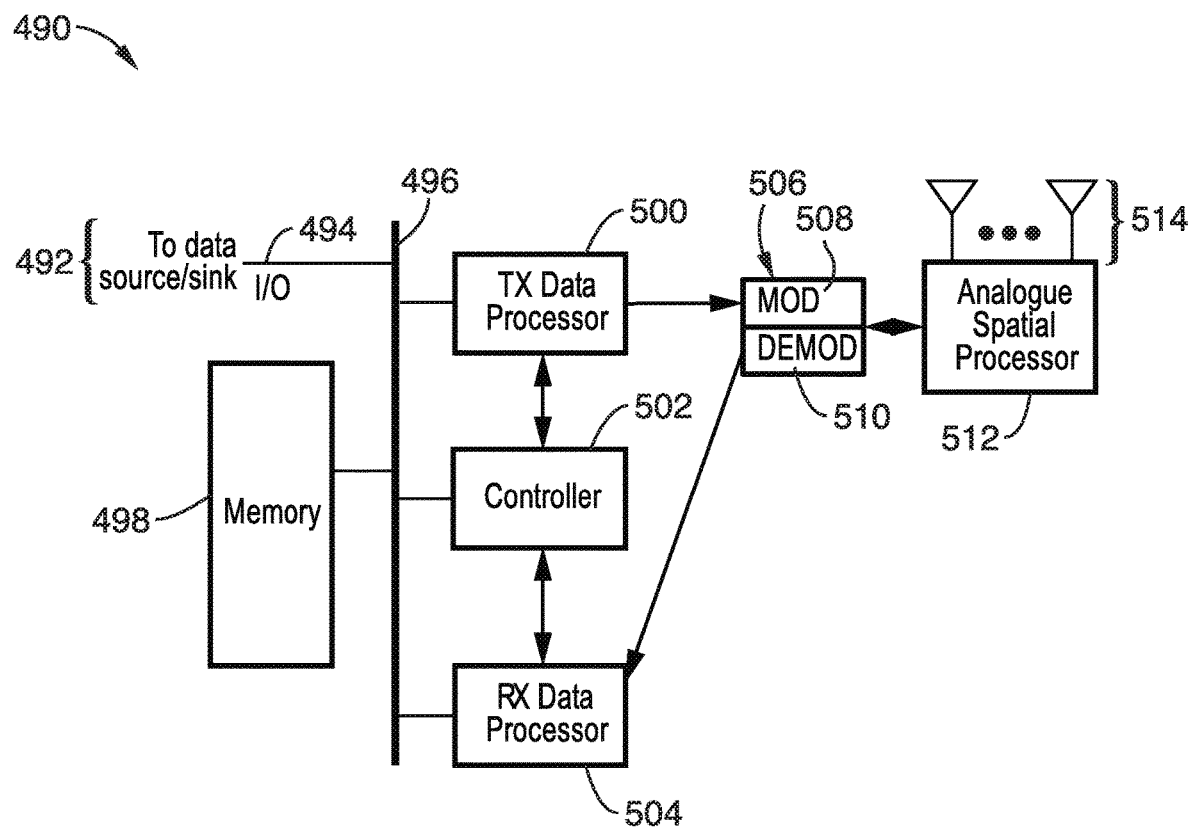
FIG. 25 is a block diagram of a single-input-single-output (SISO) station (STA) according to an embodiment of the technology of this disclosure.

FIG. 25 illustrates an example embodiment 490 of a single-input-single-output (SISO) station (STA) configured for operation according to the technology of this disclosure. A data line 492 is seen connecting from a source/sink device through connection 494 to a bus 496 to a memory 498, controller 502, TX data processor 500, and RX data processor 504. A modulator/demodulator (mod/demod) 506 is shown having modulator 508 and demodulator 510, and being coupled to the spatial processor 512 having antennas 514. TX data processor 500 is coupled for output through a modulator 508, while RX data processor 504 is coupled for input from a demodulator 510.

It will be noted that the controller accesses the memory and provides control signals to the TX data processor to access the bits from the data sink and perform scrambling, coding, interleaving of raw data, and mapping to data symbols or to the RX processor to de-map the received data symbols and perform deinterleaving, decoding, and descrambling operations. The modulator processes and modulates the digital symbols to analog symbols. The demodulator receives the analog symbols and demodulates to digital symbols.

When the station operates beamforming to a transmitting signal, the beam pattern to be utilized is commanded from TX data processor 500 to the modulator/demodulator 506. The modulator/demodulator interprets the given command and generates a command that is fed to analogue spatial processor 512. As a result, analogue spatial processor 512 shifts phases in each of its transmitting antenna elements to form the commanded beam pattern. When the station operates beamforming to a receiving signal, the beam pattern to be used is commanded from controller 504 and RX data processor 504 to the modulator/demodulator 506. Modulator/demodulator 506 interprets the given command and generates a command that is fed to analogue spatial processor 512. As a result, analogue spatial processor 512 shifts phases in each of its receiving antenna elements to form the commanded beam pattern. When the station receives a signal, the received signal is fed to controller 502, via analogue spatial processor 512, modulator/demodulator 506, and RX data processor 504. The controller 502 determines the content of the received signal, and triggers appropriate reactions, and stores information in memory 498 as described above. All the management frames, exchanged packets described above are determined and generated by controller 502. When a packet is to be transmitted on the air, the packet generated by the controller 502 is fed to analogue spatial processor 512 via TX data processor 500 and modulator/demodulator 506, whereas the transmitting beam pattern is controlled as described above simultaneously.

Figure 26:
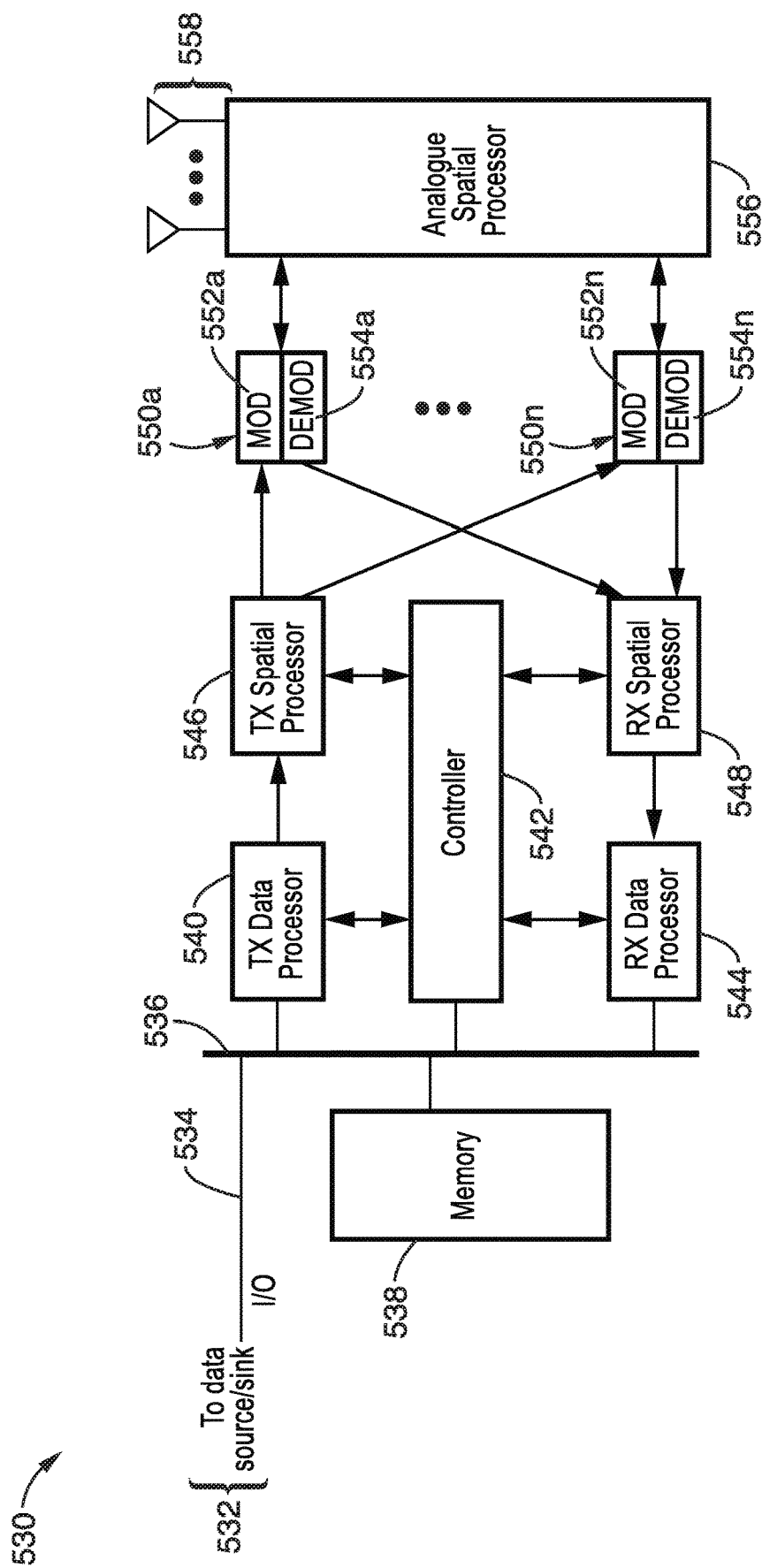
FIG. 26 is a block diagram of a single-input-single-output (MIMO) station (STA) according to an embodiment of the technology of this disclosure.

FIG. 26 illustrates an example embodiment 530 of a multiple-input-multiple-output (MIMO) station (STA) configured for operation according to the technology of this disclosure. It will be noted that the controller, modulators and demodulators perform the same basic functions as described for the previous embodiment. The TX spatial processor performs spatial precoding and spatial mapping of the spatial streams to match the transmit chains. The RX spatial processor performs spatial de-mapping of spatial streams received from the different receive chains and performs spatial decoding.

A data line 532 is seen connecting from a source/sink device through connection 534 to a bus 536 to a memory 538, controller 542, TX data processor 540, and RX data processor 544. In view of there being multiple inputs and outputs, TX data processor 540 couples to both the controller 542 and to a TX spatial processor 546. Similarly, RX data processor 544 couples to the controller 542, and receives data from a RX spatial processor 548. Multiple modulator/demodulator (mod/demod) devices 550a-550n (for example two or more) are coupled to an analogue spatial processor 556, which has a plurality of antennas 558. The individual modulators 552a-552n, of mod/demod devices 550a-550n, receive TX inputs from TX spatial processor 546. In a similar manner the individual demodulators 554a-554n, of mod/demod devices 550a-550n, receive RX inputs from antenna 558 of analog spatial processor 556 which after demodulation are passed to RX spatial processor 548.

When the station operates beamforming to a transmitting signal, the beam pattern and MIMO configuration to be used are commanded from TX data processor 540 to the TX spatial processor 546 and modulator/demodulator 550a-550n. The modulator/demodulator 550a-550n interprets the given command and generates commands that are fed to analogue spatial processor 556. As a result, analogue spatial processor 556 shifts phases in each of its transmitting antenna elements 558 to form the commanded beam pattern and MIMO configuration. When the station operates beamforming to a receiving signal, the beam pattern for use is commanded from controller 542 and RX spatial processor 548 to the modulator/demodulator 550a-550n. The modulator/demodulator 550a-550n interprets the given command and generates commands that are fed to analogue spatial processor 556. As a result, analogue spatial processor 556 shifts phases in each of its receiving antenna elements to form the commanded beam pattern with MIMO configuration. When the station receives a signal, the received signal is fed to Controller 542, via analogue spatial processor 556, modulator/demodulator 550a-550n, and RX spatial processor 548. The controller 542 determines the content of the received signal, and triggers appropriate reactions, and stores information in memory 538 as described above. All the management frames, exchanged packets described above are determined and generated by controller 542. When a packet is to be transmitted on the air, the packet generated by the controller 542 is fed to analogue spatial processor 412 via TX data processor 540, TX spatial processor 546, and modulator/demodulator 550a-550n, whereas the transmitting beam pattern are controlled as described above simultaneously.

The enhancements described in the presented technology can be readily implemented within various wireless communication devices. It should also be appreciated that wireless data communication devices are typically implemented to include one or more computer processor devices (e.g., CPU, microprocessor, microcontroller, computer enabled ASIC, etc.) and one or more associated memories storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computation systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A wireless communication apparatus, comprising: (a) a wireless communication circuit configured for wirelessly communicating with other wireless communication stations; (b) a computer processor coupled to said wireless communication circuit; (c) a non-transitory computer-readable memory storing instructions executable by the computer processor; and (d) wherein said instructions, when executed by the computer processor, perform steps comprising: (d)(i) communicating with the other wireless communication stations utilizing a routing protocol; (d)(ii) performing primary and secondary path discovery in establishing communications with a destination wireless communication station, through intermediate wireless communication stations; (d)(iii) determined by the processor that intermediate station of the primary and secondary path to be selected such that the antenna pattern for the primary and secondary path are spatially uncorrelated, using BF training information toward candidate intermediate stations; and (d)(iv) transmitting data on the primary and the same data on the secondary path, for receipt by the destination wireless communication station toward overcoming link blockages of the primary path in response to data received on the secondary path.

2. The apparatus of any preceding embodiment, wherein said instructions when executed by the computer are configured to provide reception at a destination station which is selected from the group of reception types consisting of: uncoordinated reception, coordinated reception by combining received signal powers, or coordinated reception with conditional reception from the secondary routing path.

3. The apparatus of any preceding embodiment, wherein said instructions when executed by the computer are configured for utilizing ready-to-send (RTS), clear-to-send (CTS) procedures.

4. The apparatus of any preceding embodiment, wherein said instructions when executed by the computer are configured for utilizing a modified RTS frame and CTS frame to coordinate transmissions on both the primary and secondary paths.

5. The apparatus of any preceding embodiment, intermediate stations determine if the secondary path segments are not part of the primary path and perform adjusting a path cost metric to assure said secondary path is independent of said primary path.

6. The apparatus of any preceding embodiment, wherein said instructions when executed by the computer are configured for utilizing a handshaking mechanism at the destination wireless communication station to coordinate the reception of data from the two routes to minimize errors and delay in reception.

7. The apparatus of any preceding embodiment, wherein said routing protocol is an extension of an ad-hoc on-demand distance vector (AODV) routing protocol.

8. The apparatus of any preceding embodiment, wherein said instructions when executed by the computer processor are configured for performing primary and secondary path discovery in establishing communications with a destination wireless communication station in response to utilizing extended routing request (RREQ) and routing reply (RREP) information elements sent to neighboring stations.

9. The apparatus of any preceding embodiment, wherein said instructions when executed by the computer processor are configured for utilizing said extended routing request (RREQ) and routing reply (RREP) information elements which contain a distinct extended identifier which differentiates them from a conventional (non-extended) routing request (RREQ) and routing reply (RREP), and each contain a routing flag indicating a selection between a primary routing path and a secondary routing path.

10. The apparatus of any preceding embodiment, wherein said instructions when executed by the computer processor are configured for adjusting path cost metric on an intermediate station (STA) in response to signal processing capability of a station on that path.

11. The apparatus of any preceding embodiment, wherein said instructions when executed by the computer processor are configured for identifying independence of the secondary path segment it belongs, so that an intermediate station (STA) can identify this independence with respect to the primary path.

12. The apparatus of any preceding embodiment, wherein said instructions when executed by the computer processor are configured for adjusting the path cost metric in an intermediate station (STA) in response to independence of the secondary path segment it belongs to with respect to the primary path.

13. The apparatus of any preceding embodiment, wherein said wireless communication circuit comprises a single-input-single-output (SISO) wireless communication circuit.

14. The apparatus of any preceding embodiment, wherein said single-input-single-output (SISO) wireless communication circuit, comprises: (a) a transmitter data processor which receives source data, processes it for transmission according to the routing protocol; (b) a modulator receiving digital output from said transmitter data processor, converting it to an analog TX signal; (c) an analog spatial processor coupled to multiple antennas, and configured for receiving said analog TX signal and coupling this to the multiple antennas for wireless transmission; (d) a demodulator receiving analog input from said analog spatial processor, converting it to a digital signal; and (e) a receiver data processor which receives digital signals from said demodulator, and generates a sink data stream for output.

15. The apparatus of any preceding embodiment, wherein said wireless communication circuit comprises a multiple-input-multiple-output (MIMO) wireless communication circuit.

16. The apparatus of any preceding embodiment, wherein said multiple-input-multiple-output (MIMO) wireless communication circuit, comprises: (a) a transmitter data processor which receives source data, processes it for transmission according to the routing protocol; (b) a transmitter spatial processor which spatially converts the output from said transmitter data processor to spatial outputs; (c) a plurality of modulators each receiving one of the spatial outputs and converting it to an analog TX signal; (d) an analog spatial processor coupled to multiple antennas, and configured for receiving said analog TX signal from each of said plurality of modulators and coupling this to the multiple antennas for wireless transmission; (e) a plurality of demodulators receiving analog input from said analog spatial processor, converting it to digital receiver signals; (f) a receiver spatial processor which receives digital receiver signals from said plurality of demodulators, and spatially processes them into a digital data output; and (g) a receiver data processor which receives digital data output from said receiver spatial processor from which it generates a sink data stream for output.

17. The apparatus of any preceding embodiment, wherein said apparatus is utilized in a communication application selected from the group of wireless communication applications consisting of: wireless local area networks (WLANs), wireless personal area networks (WPANs), wireless multiple hop relaying networks, peer-to-peer (P2P) communications, outdoor wireless communications, Wi-Fi networks, Internet of things (IoT) applications, backhauling of data by mesh networking, next generation cellular networks with D2D communications, 802.11 networks, and ZigBee.

18. A wireless communication apparatus, comprising: (a) a wireless communication circuit configured for wirelessly communicating with other wireless communication stations; (b) a computer processor coupled to said wireless communication circuit; and (c) a non-transitory computer-readable memory storing instructions executable by the computer processor; (d) wherein said instructions, when executed by the computer processor, perform steps comprising: (d)(i) communicating with the other wireless communication stations utilizing a routing protocol; (d)(ii) performing primary and secondary path discovery in establishing communications with a destination wireless communication station, through intermediate wireless communication stations; (d) (iii) determined by the processor that intermediate station of the primary and secondary path to be selected such that the antenna pattern for the primary and secondary path are spatially uncorrelated, using BF training information toward candidate intermediate stations; (d)(iv) utilizing ready-to-send (RTS), clear-to-send (CTS) procedures, with a modified RTS frame and CTS frame, to coordinate transmissions on both the primary and secondary paths; and (d)(v) transmitting data on the primary and the same data on the secondary path, for receipt by the destination wireless communication station toward overcoming link blockages of the primary path in response to data received on the secondary path.

19. The apparatus of any preceding embodiment, wherein said instructions when executed by the computer processor are configured for intermediate stations determining if the secondary path segments are not part of the primary path and adjusting a path cost metric to assure said secondary path is independent of said primary path.

20. A method for wireless communication between stations, comprising: (a) communicating with other wireless communication stations utilizing a routing protocol which controls a wireless communication circuit having a transmitter and receiver; (b) performing primary and secondary path discovery in establishing communications with a destination wireless communication station, through intermediate wireless communication stations; (c) determining by intermediate stations that secondary path segments are not part of the primary path and adjusting a path cost metric to assure said secondary path is independent of said primary path; and (d) transmitting the same data on both the primary and the secondary path.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A wireless communication apparatus, comprising:
   (a) a wireless communication circuit configured for wirelessly communicating with other wireless communication stations;
   (b) a computer processor coupled to said wireless communication circuit;
   (c) a non-transitory computer-readable memory storing instructions executable by the computer processor; and
   (d) wherein said instructions, when executed by the computer processor, perform steps comprising:
      (i) communicating with the other wireless communication stations utilizing a routing protocol;
      (ii) performing primary and secondary path discovery in establishing communications with a destination wireless communication station, through intermediate wireless communication stations;
      (iii) utilizing BF training information in selecting intermediate stations along the primary and secondary path to assure that the antenna pattern for the primary and secondary path are spatially uncorrelated;
      (iv) wherein said BF training information is collected in response to a beamforming (BF) training process of training an initiator of the training process with an initiator sector sweep (ISS), training a peer station responding to the ISS with a responder sector sweep (RSS), and returning sector sweep (SSW) feedback comprising BF training information; and
      (v) transmitting data on the primary and the same data on the secondary path, for receipt by the destination wireless communication station toward overcoming link blockages of the primary path in response to data received on the secondary path.

2. The apparatus of claim 1, wherein said instructions when executed by the computer are configured to provide reception at a destination station which is selected from the group of reception types consisting of: uncoordinated reception, coordinated reception by combining received signal powers, or coordinated reception with conditional reception from the secondary routing path.

3. The apparatus of claim 1, wherein said instructions when executed by the computer are configured for utilizing ready-to-send (RTS), clear-to-send (CTS) procedures.

4. The apparatus of claim 3, wherein said instructions when executed by the computer are configured for utilizing a modified RTS frame and CTS frame to coordinate transmissions on both the primary and secondary paths.

5. The apparatus of claim 1, wherein said instructions when executed by the computer are configured for having intermediate stations determine if the secondary path segments are not part of the primary path and perform adjusting a path cost metric to assure said secondary path is independent of said primary path.

6. The apparatus of claim 1, wherein said instructions when executed by the computer are configured for utilizing a handshaking mechanism at the destination wireless communication station to coordinate the reception of data from the two routes to minimize errors and delay in reception.

7. The apparatus of claim 1, wherein said routing protocol is an extension of an ad-hoc on-demand distance vector (AODV) routing protocol.

8. The apparatus of claim 1, wherein said instructions when executed by the computer processor are configured for performing primary and secondary path discovery in establishing communications with a destination wireless communication station in response to utilizing extended routing request (RREQ) and routing reply (RREP) information elements sent to neighboring stations.

9. The apparatus of claim 8, wherein said instructions when executed by the computer processor are configured for utilizing said extended routing request (RREQ) and routing reply (RREP) information elements which contain a distinct extended identifier which differentiates them from a conventional (non-extended) routing request (RREQ) and routing reply (RREP), and each contain a routing flag indicating a selection between a primary routing path and a secondary routing path.

10. The apparatus of claim 1, wherein said instructions when executed by the computer processor are configured for adjusting path cost metric on an intermediate station (STA) in response to signal processing capability of a station on that path.

11. The apparatus of claim 1, wherein said instructions when executed by the computer processor are configured for identifying independence of the secondary path segment it belongs, so that an intermediate station (STA) can identify this independence with respect to the primary path.

12. The apparatus of claim 1, wherein said instructions when executed by the computer processor are configured for adjusting the path cost metric in an intermediate station (STA) in response to independence of the secondary path segment it belongs to with respect to the primary path.

13. The apparatus of claim 1, wherein said wireless communication circuit comprises a single-input-single-output (SISO) wireless communication circuit.

14. The apparatus of claim 13, wherein said single-input-single-output (SISO) wireless communication circuit, comprises:
(a) a transmitter data processor which receives source data, processes it for transmission according to the routing protocol;
(b) a modulator receiving digital output from said transmitter data processor, converting it to an analog TX signal;
(c) an analog spatial processor coupled to multiple antennas, and configured for receiving said analog TX signal and coupling this to the multiple antennas for wireless transmission;
(d) a demodulator receiving analog input from said analog spatial processor, converting it to a digital signal; and
(e) a receiver data processor which receives digital signals from said demodulator, and generates a sink data stream for output.

15. The apparatus of claim 1, wherein said wireless communication circuit comprises a multiple-input-multiple-output (MIMO) wireless communication circuit.

16. The apparatus of claim 15, wherein said multiple-input-multiple-output (MIMO) wireless communication circuit, comprises:
(a) a transmitter data processor which receives source data, processes it for transmission according to the routing protocol;
(b) a transmitter spatial processor which spatially converts the output from said transmitter data processor to spatial outputs;
(c) a plurality of modulators each receiving one of the spatial outputs and converting it to an analog TX signal;
(d) an analog spatial processor coupled to multiple antennas, and configured for receiving said analog TX signal from each of said plurality of modulators and coupling this to the multiple antennas for wireless transmission;
(e) a plurality of demodulators receiving analog input from said analog spatial processor, converting it to digital receiver signals;
(f) a receiver spatial processor which receives digital receiver signals from said plurality of demodulators, and spatially processes them into a digital data output; and
(g) a receiver data processor which receives digital data output from said receiver spatial processor from which it generates a sink data stream for output.

17. The apparatus of claim 1, wherein said apparatus is utilized in a communication application selected from the group of wireless communication applications consisting of: wireless local area networks (WLANs), wireless personal area networks (WPANs), wireless multiple hop relaying networks, peer-to-peer (P2P) communications, outdoor wireless communications, Wi-Fi networks, Internet of things (IoT) applications, backhauling of data by mesh networking, next generation cellular networks with D2D communications, 802.11 networks, and ZigBee.

18. A wireless communication apparatus, comprising:
(a) a wireless communication circuit configured for wirelessly communicating with other wireless communication stations;
(b) a computer processor coupled to said wireless communication circuit;
(c) a non-transitory computer-readable memory storing instructions executable by the computer processor; and
(d) wherein said instructions, when executed by the computer processor, perform steps comprising:
(i) communicating with the other wireless communication stations utilizing a routing protocol;
(ii) performing primary and secondary path discovery in establishing communications with a destination wireless communication station, through intermediate wireless communication stations;
(iii) utilizing BF training information in selecting intermediate stations along the primary and secondary path to assure that the antenna pattern for the primary and secondary path are spatially uncorrelated;

(iv) wherein said BF training information is collected in response to a beamforming (BF) training process of training an initiator of the training process with an initiator sector sweep (ISS), training a peer station responding to the ISS with a responder sector sweep (RSS), and returning sector sweep (SSW) feedback comprising BF training information;

(v) utilizing ready-to-send (RTS), clear-to-send (CTS) procedures, with a modified RTS frame and CTS frame, to coordinate transmissions on both the primary and secondary paths; and (vi) transmitting data on the primary and the same data on the secondary path, for receipt by the destination wireless communication station toward overcoming link blockages of the primary path in response to data received on the secondary path.

19. The apparatus of claim 18, wherein said instructions when executed by the computer processor are configured for intermediate stations determining if the secondary path segments are not part of the primary path and adjusting a path cost metric to assure said secondary path is independent of said primary path.

\* \* \* \* \*